US007320007B1

(12) United States Patent
Chang

(10) Patent No.: US 7,320,007 B1
(45) Date of Patent: Jan. 15, 2008

(54) DYNAMIC GENERATION OF TARGET FILES FROM TEMPLATE FILES AND TRACKING OF THE PROCESSING OF TARGET FILES

(75) Inventor: Peter Hon-You Chang, 2310 Camel Dr., Sterling Heights, MI (US) 48310

(73) Assignee: Peter Hon-You Chang, Sterling Heights, MI (US)

( * ) Notice: Subject to any disclaimer, the term of this patent is extended or adjusted under 35 U.S.C. 154(b) by 371 days.

(21) Appl. No.: 11/006,268

(22) Filed: Dec. 7, 2004

Related U.S. Application Data

(60) Provisional application No. 60/529,376, filed on Dec. 12, 2003.

(51) Int. Cl.
G06F 7/00 (2006.01)
(52) U.S. Cl. ....................... 707/102; 715/700
(58) Field of Classification Search ................ 707/3, 707/100, 101, 102, 104.1, 1; 715/514, 781, 715/517, 700, 810, 764, 508, 509, 505, 504, 715/503
See application file for complete search history.

(56) References Cited

U.S. PATENT DOCUMENTS

| | | | |
|---|---|---|---|
| 4,974,160 A | 11/1990 | Bone et al. | |
| 5,041,967 A | 8/1991 | Ephrath et al. | |
| 5,220,675 A | 6/1993 | Padawer et al. | |
| 5,345,550 A | 9/1994 | Bloomfield | |
| 5,530,796 A | 6/1996 | Wang | |
| 5,625,783 A | 4/1997 | Ezekiel et al. | |
| 5,630,125 A | 5/1997 | Zellweger | |
| 5,678,039 A * | 10/1997 | Hinks et al. | 707/4 |
| 5,742,818 A * | 4/1998 | Shoroff et al. | 707/200 |
| 5,760,768 A | 6/1998 | Gram | |
| 5,778,389 A | 7/1998 | Pruett et al. | |
| 5,784,583 A | 7/1998 | Redpath | |
| 5,799,325 A | 8/1998 | Rivette et al. | |
| 5,864,848 A * | 1/1999 | Horvitz et al. | 707/6 |
| 5,877,966 A | 3/1999 | Morris et al. | |
| 5,999,180 A | 12/1999 | Coskrey | |
| 6,067,087 A | 5/2000 | Krauss et al. | |

(Continued)

OTHER PUBLICATIONS

Hohenstein et al., An Approach for Generating File Interfaces, Databases Systems for Advanced Applications, 1999. Proceedings., 6th International Conference on, Apr. 19-21, 1999, pp. 61-68.*

*Primary Examiner*—Greta L Robinson
(74) *Attorney, Agent, or Firm*—Knobbe, Martens, Olson & Bear LLP

(57) ABSTRACT

A target file generation system and method for use by ordinary computer users to readily generate target files. The program includes various components. The first component promps for and receives user's selections of a folder or directory location where a new target file will reside, of an operating system command or application program that will process this new target file, of an optional global activity summary data repository that stores user'summaries of the processing of the target file. The second component dynamically generates an information exchange user interface that prompts for and receives input data provided by the user on information of menu configuration file and name of template file. The third component dynamically generates an information exchange user interface. The fourth component provides graphics user interfaces to start a menu program, a a merge programe, and a search program, respectively.

28 Claims, 24 Drawing Sheets

U.S. PATENT DOCUMENTS

| | | |
|---|---|---|
| 6,177,942 B1 | 1/2001 | Keong et al. |
| 6,243,700 B1 | 6/2001 | Zellweger |
| 6,317,143 B1 | 11/2001 | Wugofski |
| 6,317,787 B1 | 11/2001 | Boyd et al. |
| 6,487,713 B1 | 11/2002 | Cohen et al. |
| 6,751,306 B2 | 6/2004 | Himmel et al. |
| 6,826,566 B2 | 11/2004 | Lewak et al. |
| 6,886,025 B1 * | 4/2005 | Britton ........................ 709/201 |
| 6,904,568 B2 | 6/2005 | Colgrove |
| 7,020,660 B2 * | 3/2006 | Woodring ............... 707/103 R |
| 7,027,975 B1 | 4/2006 | Pazandak et al. |
| 7,254,784 B2 * | 8/2007 | Chang ........................ 715/810 |
| 2001/0002128 A1 | 5/2001 | Takayama et al. |
| 2002/0065818 A1 | 5/2002 | Starr |
| 2003/0098891 A1 | 5/2003 | Molander |
| 2003/0131340 A1 | 7/2003 | McArdle |
| 2004/0143583 A1 * | 7/2004 | Poole et al. ................. 707/100 |
| 2005/0044491 A1 * | 2/2005 | Peterson ..................... 715/517 |

* cited by examiner

Graphics User Interface

Generated Dialog Window for Menu Information

Generated Dialog Window for Place Holders Information

Menu Items of View Menu

Database Object Model Diagram

Menu Items of Tools Menu

DYNAMIC GENERATION OF TARGET FILES FROM TEMPLATE FILES AND TRACKING OF THE PROCESSING OF TARGET FILES

CROSS-REFERENCE TO RELATED APPLICATION

This application claims priority from U.S. provisional patent application Ser. No. 60/529,376 filed Dec. 12, 2003 by peter H. Chang entitled "User-Driven Menu Generation System with Dynamic Generation of Target Files From Template Files", the entire specification of which is incorporated herein by reference. This application is an enhancement of co-pending non-provisional patent application entitled "User-Driven Menu Generation System with Multiple Submenus" having application Ser. No. 10/639,940 filed on Aug. 13, 2003. Throughout this application document, this co-pending non-provisional patent application document is referred as the UDMGS system.

FIELD OF THE INVENTION

The invention relates in general to systems and methods for the use of template files and the approach of dynamically generating the initial (first) versions of target file resources of a computer operating system platform from the template files. The systems and methods then process the generated versions of the target files by executing operating system commands or application programs that are selected by users. The systems and methods next employ menus and activity summary files that are proposed in the systems of the co-pending USMGS to track the processing of the target files.

DISCUSSION

For any new file resource that is to be a text file, referred here as the target file, that requires changes only for a relatively smaller number of fields, referred here as changeable fields, over a period of time after its creation and that its unchangeable lines and unchangeable fields are known beforehand, the invention introduces the use of a template file containing placeholders for the changeable fields. The remaining parts of the template file consist of unchangeable lines and unchangeable fields for the target file. The invention introduces a method of dynamically generating a dialog frame window, based on the placeholders, that prompts a user to enter values for the changeable fields. The method dynamically generates the target file from the template files with the user inputs. For any new target file that is not to be a text file, the method offers the users an option that dynamically copies a previously created and user-selectable template file to the target file.

Many operating system commands and individual application programs that run on various computers create the initial versions of new target files as empty files. Examples of such operating systems programs or application programs include but not limited to text editor program, word processing program, spreadsheet program, and database interface program. The conventional approach is that users of these programs need to manually expand the initial versions of the target files. Many operating systems on various computers allow users to invoke operating system commands and individual programs to process target files that they wish to expand or modify. These operating systems may also allow the user to initiate the execution of various background or system finctions to process target files, some of which are quite complex in structures but contain many repetitive unchangeable fields. The tasks of processing these target files are mostly assigned to experienced technical professionals who know the inner structures of the files in details. A shortcoming of the conventional approach is that experienced business non-technical professionals who know the business functions of the programs are kept from directly processing the target files. For target files that are of the text file type, it would be useful to provide template files that contain the known repetitive changeable fields and to provide systems and methods to parse the template files for changeable fields and then dynamically generate dialog frame windows that prompt users, technical or non-technical, to enter input for the changeable fields. This approach saves the complex details of the structures of the target files from the business non-technical users and allows them to directly processing the target files. For target files that are not the text file type, it would be useful to provide to users an option that copies previously created template files to the target files.

Another shortcoming of the conventional approach is that manually expanding empty target files to versions of complex structures tend to be error-prone, even for experienced technical professionals. Moreover if a creator invoked operating systems programs or application programs to create and process too many target files without proper tracking (or logging) the activities, the creator may loose track of the folders (or directories) that store them and the purposes of processing them. The approach for the proposed systems and methods in this invention may potentially cut down the chances of manual errors by many folds. It also tracks (logs) the processing of the target files in activity summary files for future references.

SUMMARY OF THE INVENTION

In light of the foregoing limitations of the conventional approach of manually expanding empty target files and losing track of the activities of processing them, and as a part of the present invention, I have recognized it would be useful to have an easy and largely automatic way to process target files that includes dynamically generating target files from template files and by tracking the processing of the target files for future references. The present invention enhances the AutoGenMenu Program ("AGM Program") and the Activity Tracking Program ("AT Program") of the UDMGS system that tracks the processing of files.

To overcome the one or more of the forgoing limitations, there is provided, in accordance with a first aspect of the present invention, a system with dynamic generation of target files from template files for use by ordinary computer users. The system may comprise a program operable by an ordinary computer user and collections of template files and menu configuration files editable by system management personnel. This main program preferably includes a few different components, which may be written as parts of one large program, or may be subprograms or modules or routines or objects called by the main program. These components will now be briefly summarized.

The first component is operable by an ordinary computer user to select a folder or directory location where the new target file will reside and to select an operating system command or application program that will process this new target file. The component also offers the user an option to select a data repository such as but not limited to a file or a database table that tracts globally the user's activities of invoking operating system commands or application programs to process target files across the global folder structure or directory structure. The component also passes, in the background, the user-selected information to the other components of this invention.

The second component is operable by an ordinary user to receive prompting message from and enter data to a dynamically generated information exchange user interface such as but not limited to a dialog frame window on selecting a template file for a target file. For a new target file that is a text file and that is of a certain file type category, the component enables the users to readily create the initial version of the new target file from a template file that is selected by a user among previously created template files. For a target file to be of this category, only a relatively smaller number of fields in its content require changes over a period of time after its creation and the remaining unchangeable lines and unchangeable fields are known beforehand. For a new target file that is not a text file, the component enables the user to readily copy a previously created and user-selectable template file to the target file.

The third component is operable by an ordinary user to enter data for the changeable fields in the user-selected template file for a new target file that is a text file without knowing the internal structures of the template file and the target file. This component specifies a rule that identifies changeable fields, along with other rules specified by the conventions of the operating system command or application program that is to process the target file on the standard structure of the target file, on the layout of the internal structure of a template file. The component dynamically parses the internal structure of a template file created under these rules and extracts the identifications of the changeable fields and use these identifications as prompting labels to dynamically generate an information exchange user interface such as but not limited to a dialog frame window to prompt for and receive the inputs of a user for the data (fill-in values) of the changeable fields in the template file. The component, in the background, completes the task of generating the new target file by filling the changeable field locations with the fill-in values provided by the user.

The fourth component is operable by an ordinary user to readily include the invocations of operating system commands or application programs to process a new target file as new menu items in a user selected menu. The component also provides a graphics user interface to start the AutoGenMenu Program of the UDMGS system that displays menus selected by a user and invokes programs associated with menu items selected by a user. In addition the component also provides a graphic user interface for the Merge Program of the UDMGS system that merges any pair of user-selected folders or directories that contain target files or menus of similar functions such as but not limited to similar folders or directories created by co-workers that are deemed to be suitable candidates to be merged. The fourth component is also operable by an ordinary user to readily track the processing of newly generated target files by user-selected operating system commands or application programs in activity summary files for future references. The component also provides a graphics user interface for the Search Program of the UDMGS system to search for any number of character strings in the activity summary files for future references such as but not limited to serving as data repository for string searches.

In the target file generation system of the present invention, the third component is preferably operable to access at least a plurality of stored in the storage locations. These files preferably include template files stored in a designated folder or directory, at least one command map file and at least one menu configuration file. The template files are supposed to be created by personnel skilled in the internal structures of their layouts, such as but not limited to system management personnel, by following the rule of the structural layout specified by the system for this invention on the identification of changeable fields and by following the conventions of the operating system commands or application programs that are to process the target files on their structural layouts. The command map file is organized to store a plurality of operating system commands or application programs and a set of aliases used as a shortcut technique for referencing certain ones of the operating system commands or application programs. The menu configuration file is organized to store data that is a part of the process of creating and displaying a menu. These and other aspects of the present invention, including the methods of the present invention, may be further understood by referring to the detailed description below, accompanying Figures, and appended claims.

BRIEF DESCRIPTIONS OF THE DRAWINGS

FIG. 4 is a flow chart that illustrates the steps of the Activity Tracking with Menu Program. This program enhances the Activity Tracking Program (AT Program) of the UDMGS system. The program starts the tracking of the processing of a file resource by an application program.

Figure 5A:
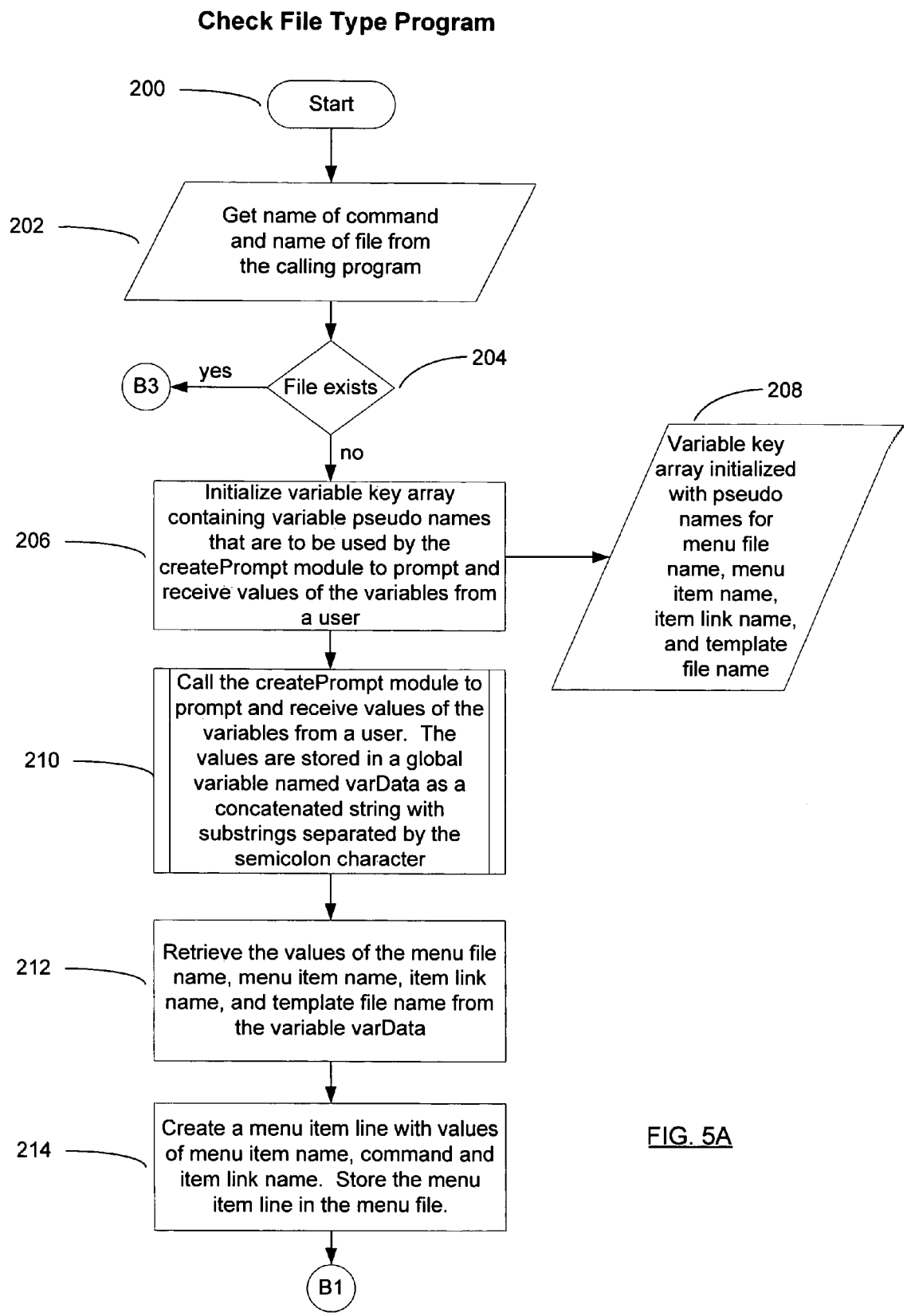
Figure 5B:
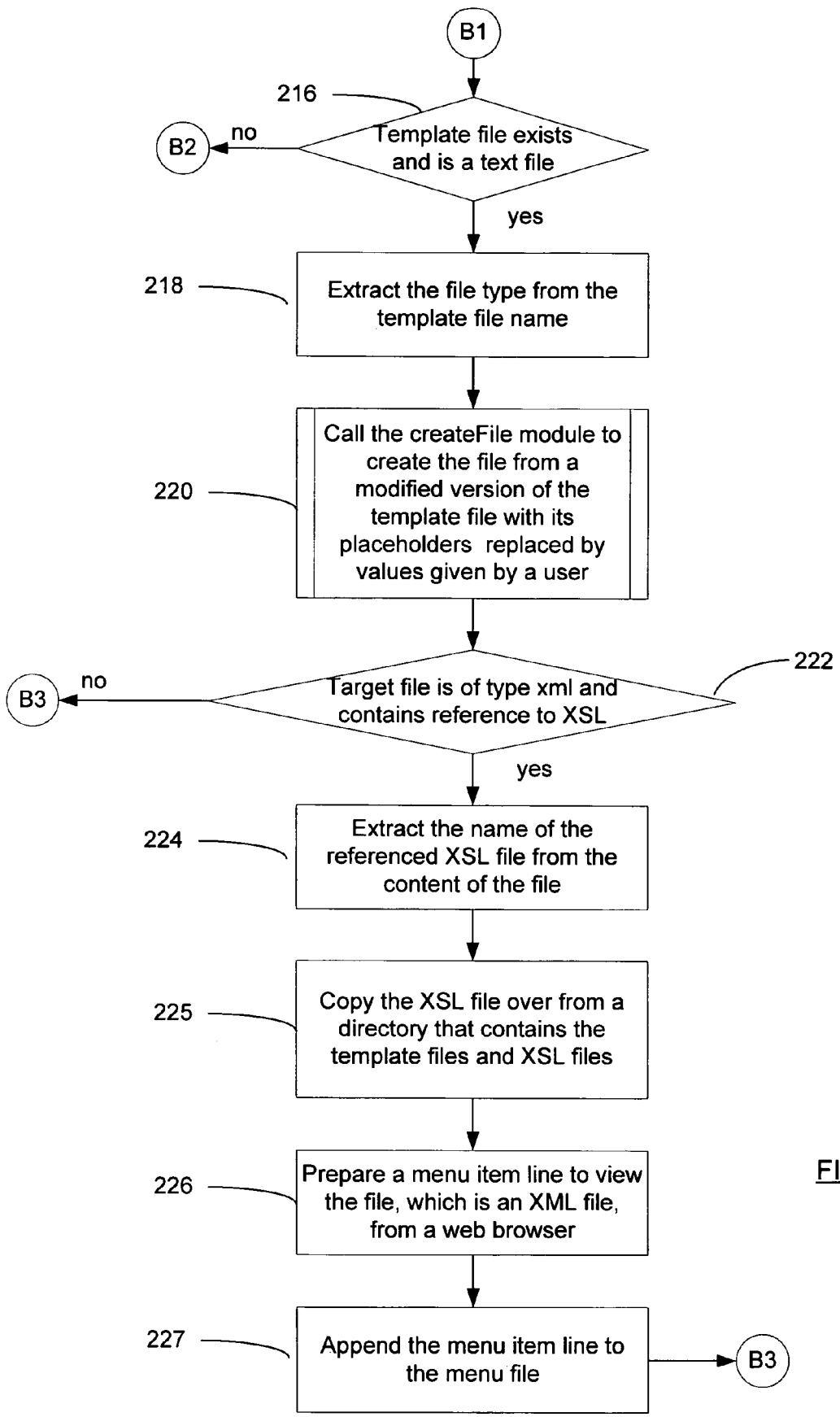

FIG. 5 is a flow chart that illustrates the steps of the Check File Type Program. This program performs tasks or calls other modules in generating target files from template files and invokes a user-selected application program to process the new target file.

FIG. 6 is a flow chart that illustrates the steps of the createPrompt module. This module receives from the calling program or calling module prompting information that if will use to create a program that displays a dialog window to prompt for and to collect inputs from a user.

FIG. 7 is a flow chart that illustrates the steps of the Dynamic Dialog Frame Program. The program generates a dialog frame window on an operating system platform that supports graphics. The dialog frame prompts a user to enter values for its text field objects.

Figure 8:
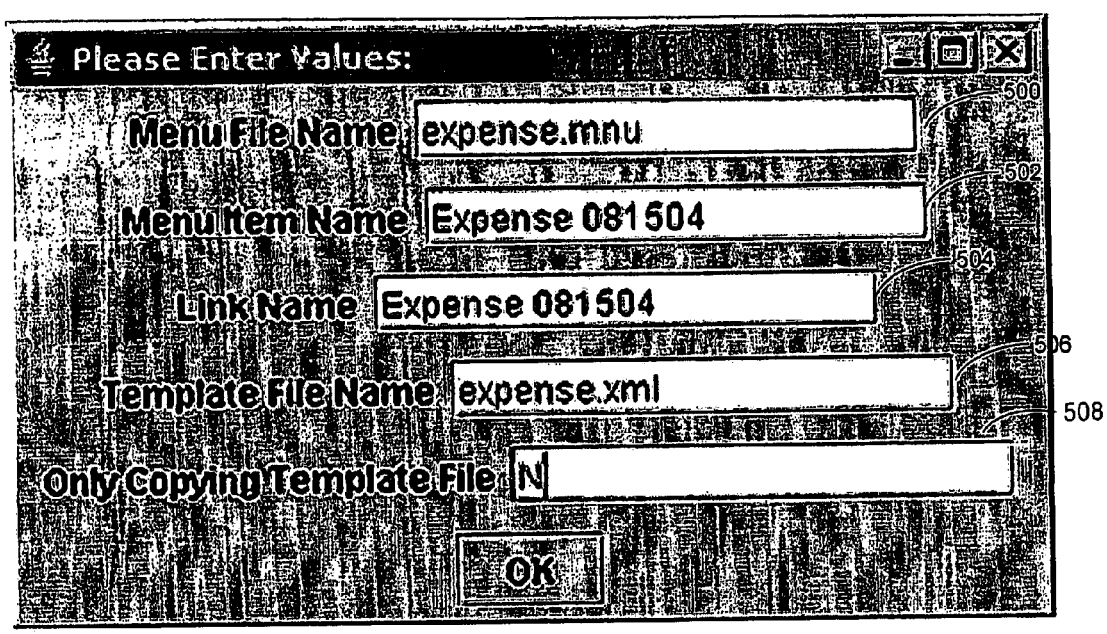

FIG. 8 illustrates the screen image of a dialog frame window created by executing a Dynamic Dialog Frame Program for the purpose of prompting for and collecting user input for menu related information and optionally for the name of a template file.

FIG. 9 is a flow chart that illustrates the steps of the getKeyValues module. The module extracts filed variable names (or identifications) from the placeholders in a template file.

FIG. 10 is a flow chart that illustrates the steps of the createFile module. The module performs the task of generating the target file from a template file and from input data entered by a user on a dynamically generated dialog frame window.

Figure 11:
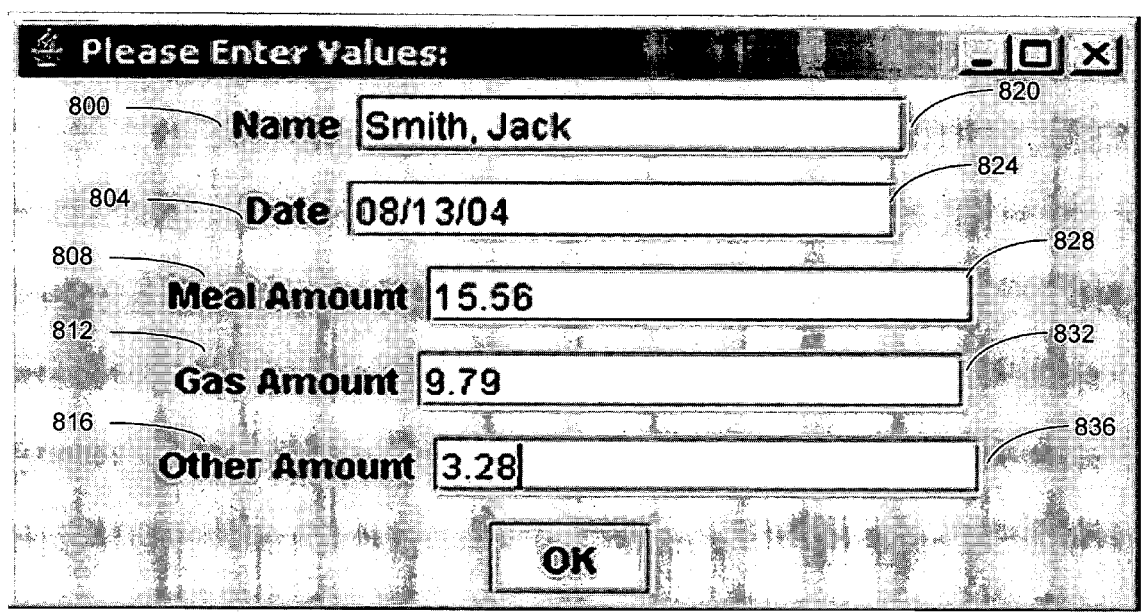

FIG. 11 illustrates the screen image of a dialog frame window created by executing a Dynamic Dialog Frame Program that is generated from using the extracted field names from the placeholders in an XML based template file as labels in the dialog frame window.

Figure 12:
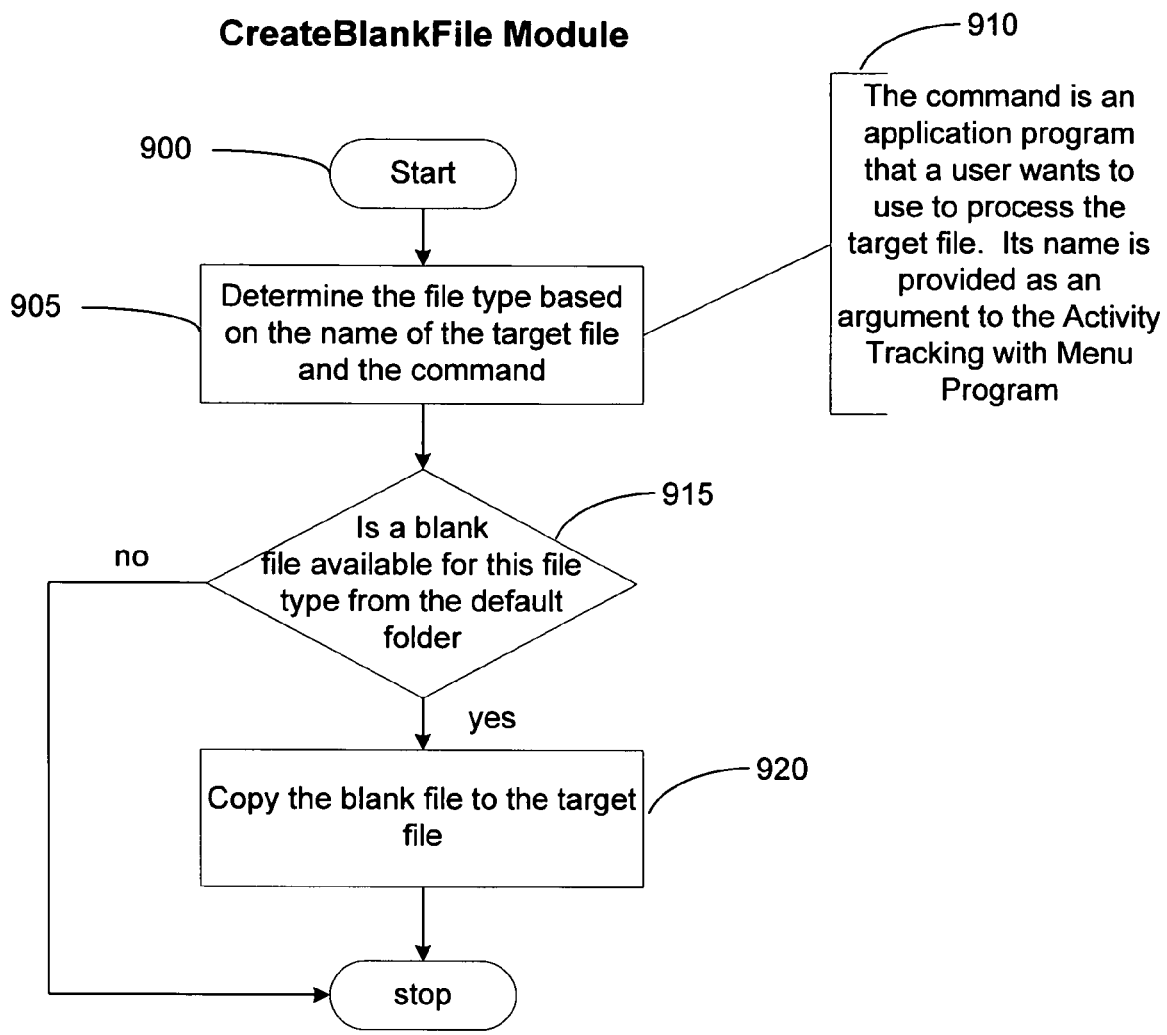

FIG. 12 is a flow chart that illustrates the steps of the createBlankFile module. The module creates an empty new target file, of which the file type is in the category of certain file types, to drop the warning messages for some application programs if the target files that they are to process do not exist.

Figure 2:
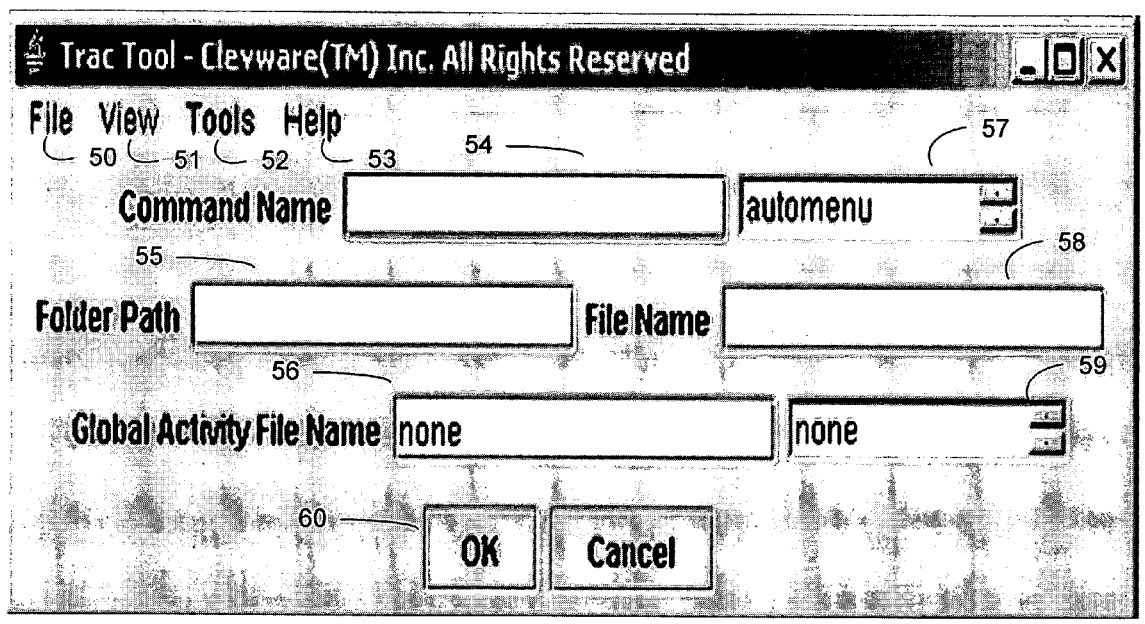
FIG. 2 illustrates the screen image displayed by the Graphics User Interface Program for the systems and methods of the invention.
Figure 13:
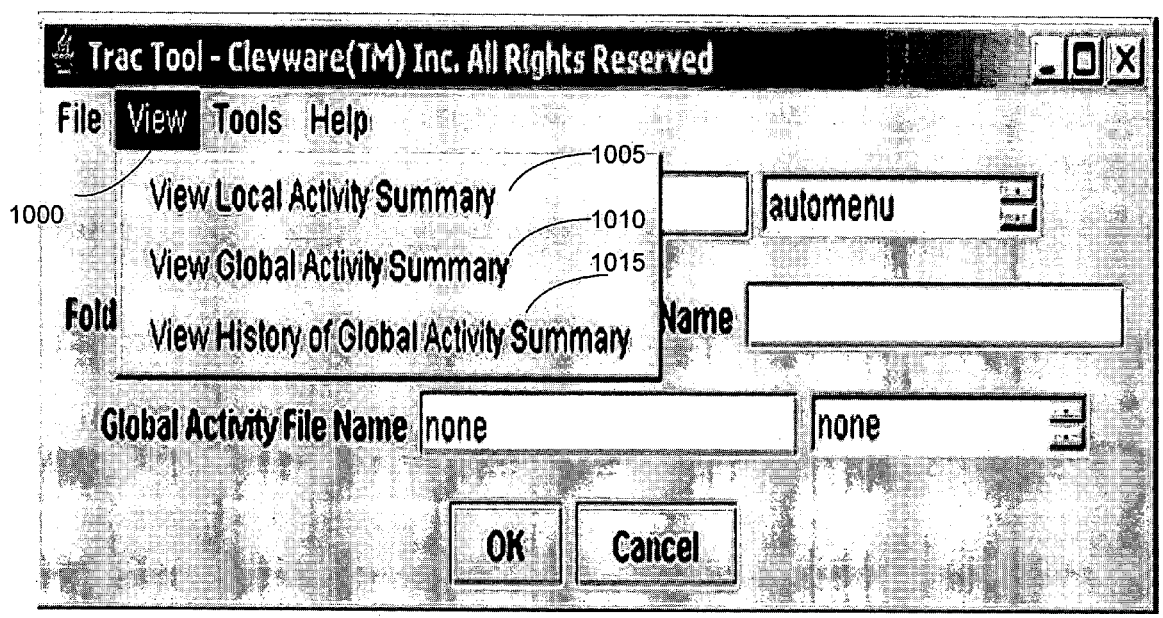

FIG. 13 illustrates the menu items if a user clicks on the View menu at box 51 of FIG. 2 or box 1000 of FIG. 13.

Figure 14:
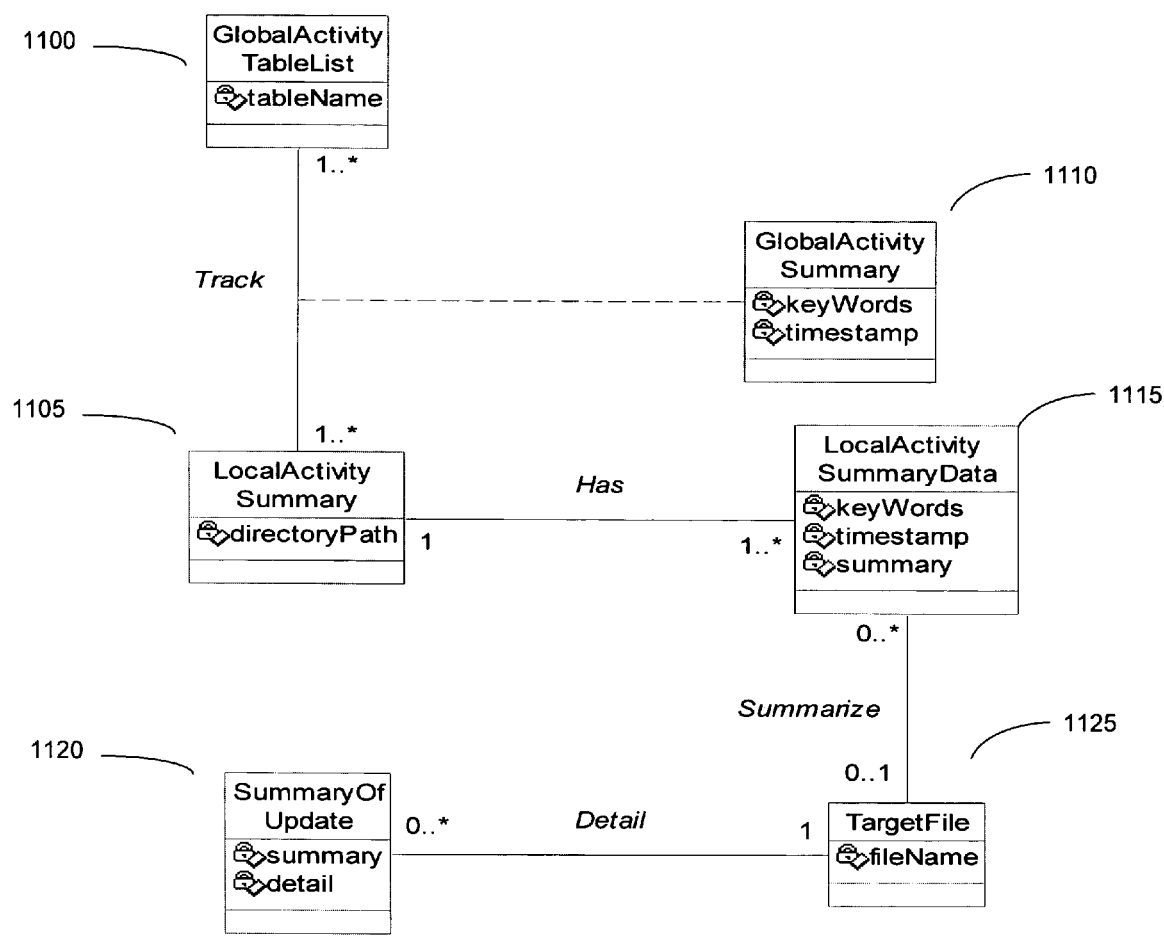

FIG. 14 illustrates a Database Object Modeling Diagram that guides a design and implementation of a database that contains local activity summary tables and global activity summary tables. This is the case that if a Relational Database is used instead of files to store data for local activity summary and for global activity summary.

Figure 15:
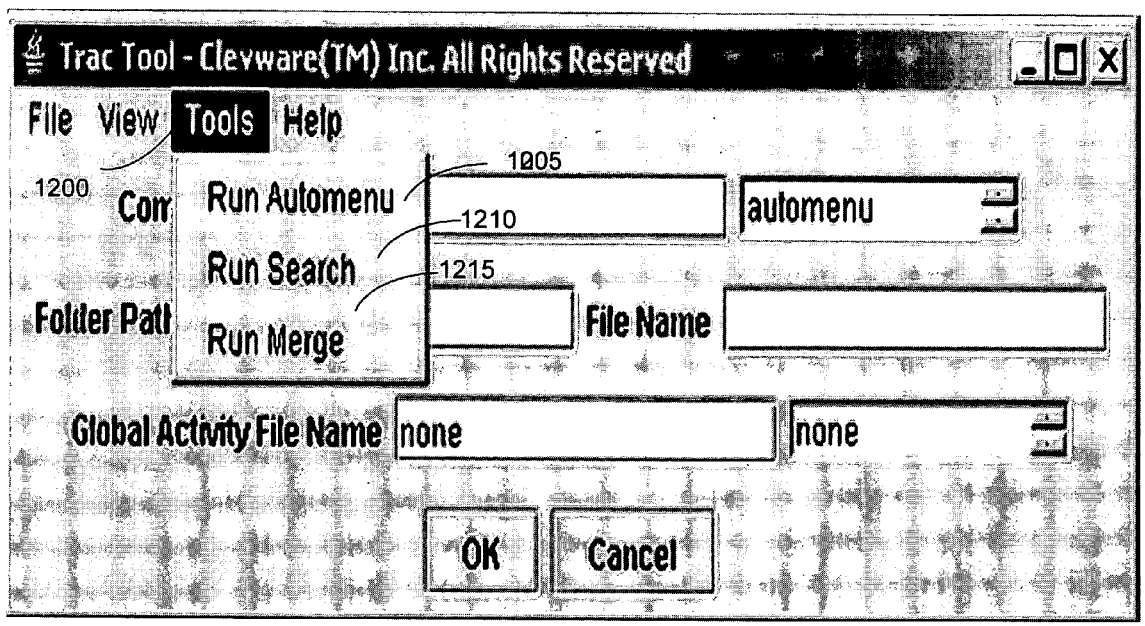

FIG. 15 describes the drop down menu when a user clicks on the Tools menu on the menu bar at 52 of FIG. 2 and at 1200 of FIG. 15.

DETAILED DESCRIPTION OF PREFERRED EMBODIMENTS

The systems and methods of the present invention are illustrated and described herein in connection with certain embodiments, with the perception that the present disclosure is to be regarded as an exemplification of the various aspects and principles of the present invention and the associated functional specifications required for their implementation. However, it should be appreciated that the systems and methods of the present invention may be implemented in still different configurations, forms and variations, based on the understandings herein.

The systems and methods of the present invention typically may be used with and operate on and/or within an ordinary user's computer system. The examples of such computer systems are desktop computer, laptop or notebook computer, and/or computer workstation, whether used in a standalone fashion or as part of larger computer network that is required by the processing operating system or application program. The computer systems may be installed with any suitable operating system (OS), such as but not limited to Unix, Linux, Microsoft (MS) Windows or MS-DOS, Apple DOS, and the MAC OS for the Apple computer platforms. The systems and methods of the present invention may also be used in suitably personal digital assistants (PDA) or other computerized personal devices, including communication devices, such as digital cell phones, and computerized data collection devices, such as handheld data input devices including mobile logging of data, such as those used in various industries. Such portable PDA devices employ their own "light-weight" operating systems such as but not limited to the Palm OS from Palm Inc., Windows CE from Microsoft, and the Symbian OS designed for "mobile/wireless information devices" such as small, portable computer-based telephones, which are now providing with wireless access to phone and other information services, including short message services (SMS). The systems and methods of the present invention may also be used in software environments that operating broadband services and Consumer/Solar and Heliospheric Observatory (SOHO) satellite services.

In most current popular computer operating system platforms, such as UNIX/Linux or Microsoft Windows platforms, there are plenty examples of target files of the text file type that can be generated from suitable template files. Such examples include but not limited to WML (Wireless Markup Language) text files whose file names end with .wml and XML (Extensible Markup Language) text files whose file names end with .xml. Most commonly used WML files and XML files of various sizes contain many static tag name fields and static attribute name fields that stay unchanged. These files contain relatively smaller number of fields such as but not limited to data associated with the name values and attribute values that may require changes over a period of time. A benefit of the systems and methods of the invention is that it increases the productivities of ordinary users by many folds with its capability of dynamically generating WML and XML documents and thereby saving the manual efforts of the users. The capability involves with using templates with placeholders for the changeable fields. By extracting information of the placeholders, it dynamically prompts users to enter values for the changeable fields and then generates the target document.

The use of WML in wireless applications under the standard Wireless Application Protocol (WAP) is very similar to the use of Extensible Hypertext Markup Language (XHTML) for world wide web (WWW) applications. Wireless applications developed with WML are being deployed for wireless phones and PDA's. The systems and methods of the invention dynamically update a new WML file with a template file and dialog windows, which are also dynamically generated. The function of a dialog window is to display relatively smaller number of but sufficient prompt messages that prompt users to enter either needed information for the WML file or data for the changeable fields in the template file. The systems and methods save ordinary users from reading through complex WML tag names to search for changeable fields in order to enter needed information or data.

XML is an emerging Internet standard that provides functionalities of those of the HTML and much more, for example, the functionalities that support Business-to-Business (B2B) Internet applications with database data wrapped by XML tags suitable for transmissions over the Internet. The systems and methods of the invention dynamically update a new XML file with a template file and dialog windows, which are also dynamically generated. The function of a dialog window is similar to that for WML files described previously. That is, it is to display relatively smaller number of but sufficient prompt messages that prompt users to enter either needed information for the XML file or data for the changeable fields in the template file. The systems and methods save ordinary users from reading through complex XML tag names to search for changeable fields in order to enter needed information or data.

The systems and methods of the present invention include several programs or components of programs. It may be viewed as one large program with several smaller components depending upon how structured such component may run in a largely autonomous manner or may be more closely coupled or integrated with the other components.

Figure 1:
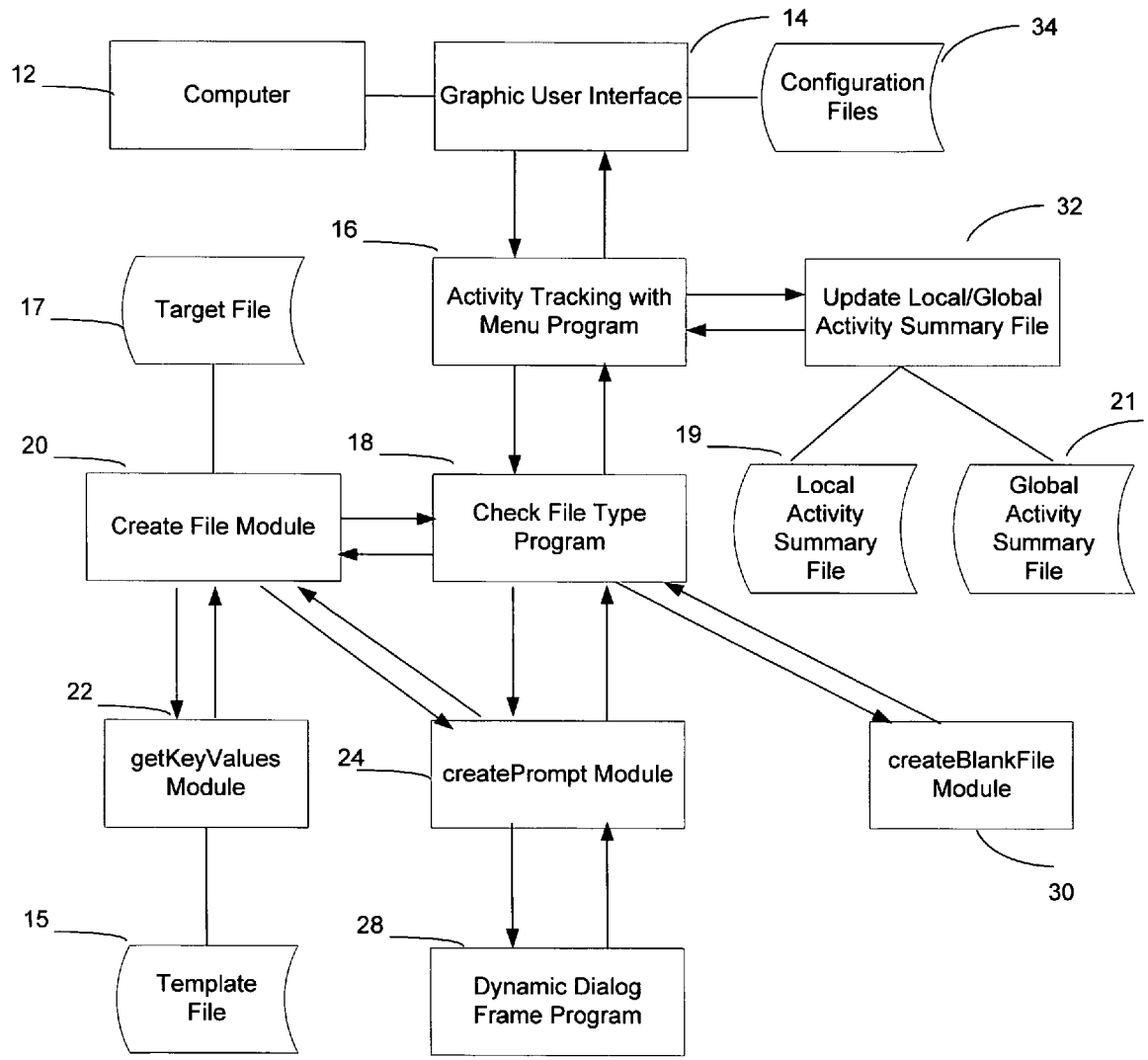
FIG. 1 illustrates the system diagram for the systems and methods of the invention.

FIG. 1 illustrates the system diagram for the computer environment in which the following four programs and four modules will be run. They are Graphics User Interface Program (box 14), Activity Tracking with Menu Program (box 16), Check File Type Program (box 18), Dynamic Dialog Frame Program (box 15), createFile module (box 20), getKeyValues module (box 22), createPrompt module (box 24), and createBlankFile module (box 30). These four programs and four modules implement the components of the systems and methods in the invention.

FIG. 2 illustrates the main screen. displayed by the Graphics Users Interface Program (GUI Program). The GUI Program displays four menus: File (box 50), View (box 51), Tools (box 52), and Help (box 53) in the menu bar. It also displays four text boxes for command name (box 54), folder path (box 55), target file name (box 58), and name of global activity summary (logging) file (box 56) that accept users' input. In addition the GUI Program reads the list of names of operating system commands and application programs from a configuration file (box 34 in FIG. 1) and displays a drop down box (box 57) containing these names. If a user selects a program name from this drop down box, then the GUI Program displays the name in the command name box on box 54. The GUI Program also reads the list of names of global activity summary files from the same configuration file (box 34 in FIG. 1) and displays a drop down box (box 59) containing these names. If a user selects a name of a global activity summary file from this drop down box, then the GUI Program displays the name in the global activity summary box on box 56. The File menu in box 50 contains but not limited to the menu item: Open. If a user wants to select a target file to be processed by a command, the user can click on the File menu and click the Open menu item to bring up a File Dialog Window, which is depicted in FIG. 3 whose description is followed next.

Figure 3:
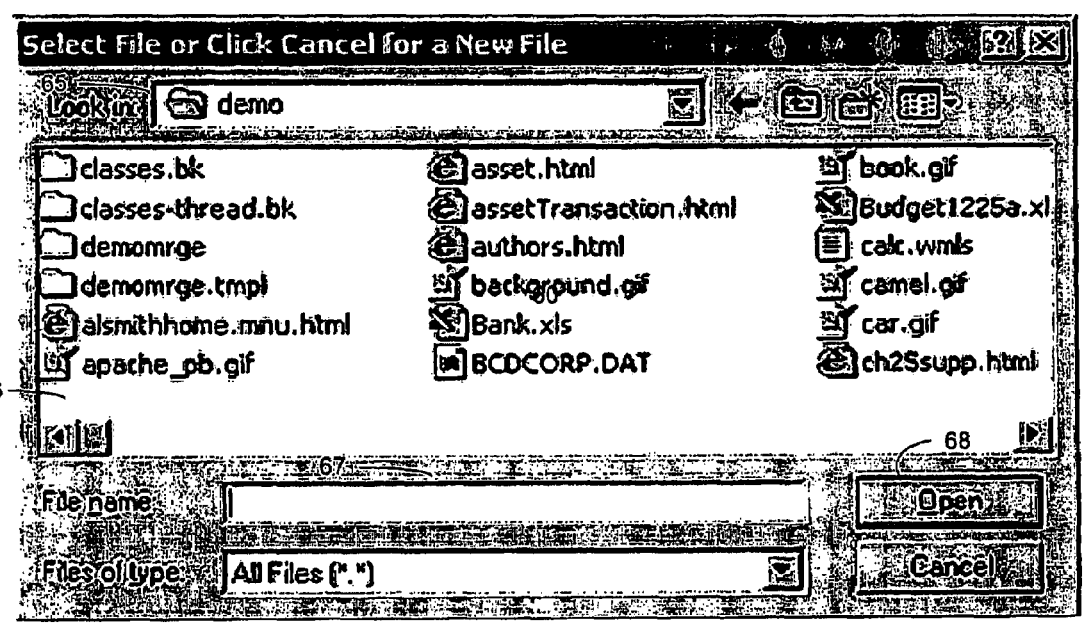
FIG. 3 illustrates an opened file dialog window if a user clicks the File menu on the menu bar on FIG. 2 and then clicks the menu item: Open.

FIG. 3 illustrates the File Dialog Window.. A user may select a folder (directory) in which to create a new target file or select an existing target file. Box 65 displays the path name of the folder. Box 66 displays the sorted list of all the files and subfolders (subdirectories) of the selected folder. If the user wants to create a new target file, then the user types in the name of the target file in box 67. If the user wants to select an existing target file in the list displayed in box 66 to process, then the user clicks the name of the target file to get it displayed in box 67. After the user fills the box 67 with the name of the target file, then the user clicks the Open button to confirm to the GUI Program of the selection the target file name. The GUI Program then fills the box of the target file name, box 58 of FIG. 2, with the user selected target file name. The user next fills the box 54 of FIG. 2 with the name of the program that is to process the target file. If the user wants to track (log) the processing of the target file, then the user also fills the box 56 of FIG. 2 with the name of a global activity summary file. For a more comprehensive coverage, for the rest of this document, it is assumed that box 56 of FIG. 2 is filled with the name of a global activity summary file because the methods for the case of not tracking the processing of the target files form a subset of the methods for the case of tracking the processing of the target files. After the user clicks the OK button in box 60 of FIG. 2, the GUI Program starts the Activity Tracking with Menu Program, which is depicted in FIG. 4 whose description is followed next.

Figure 4A:
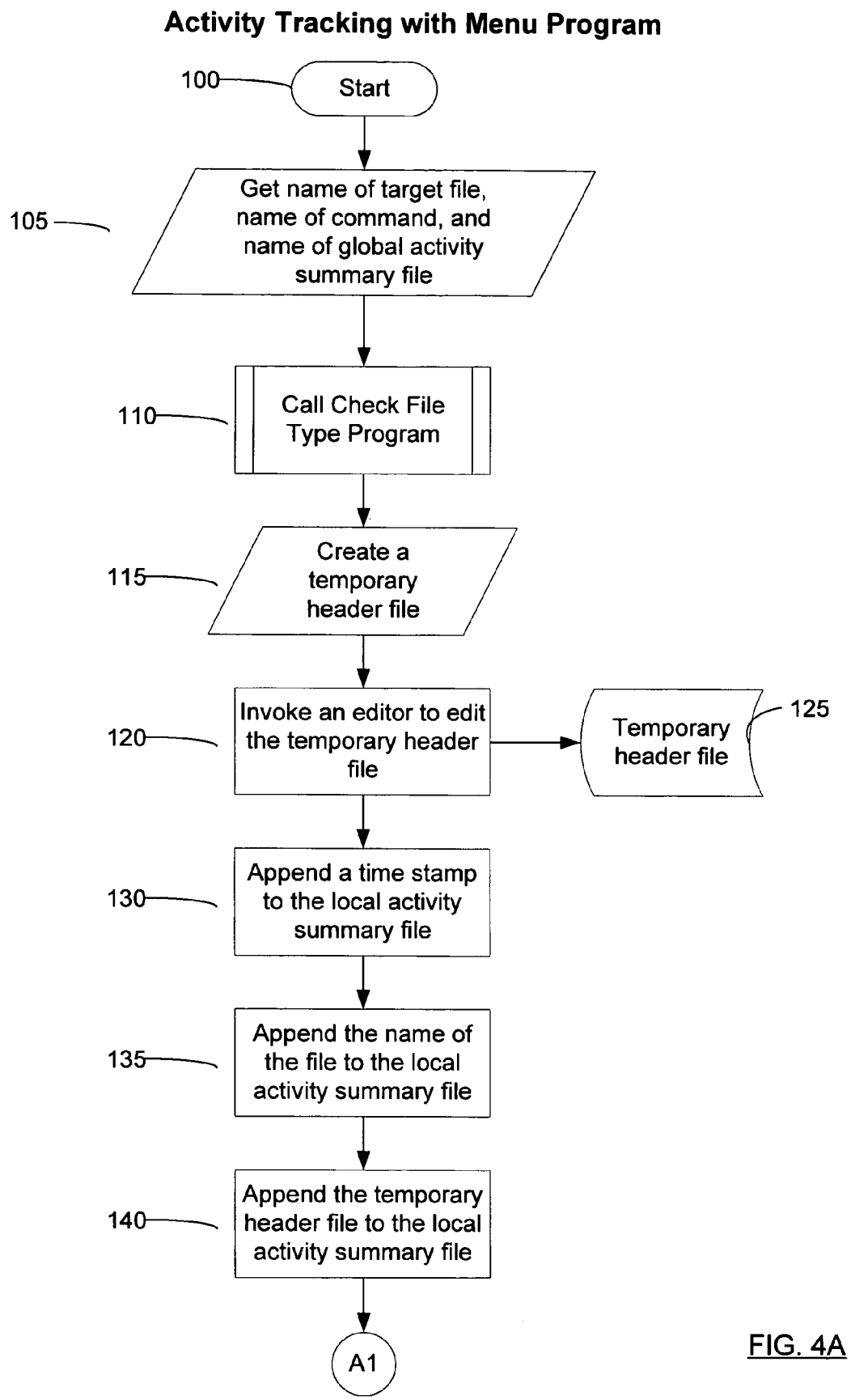
Figure 4B:
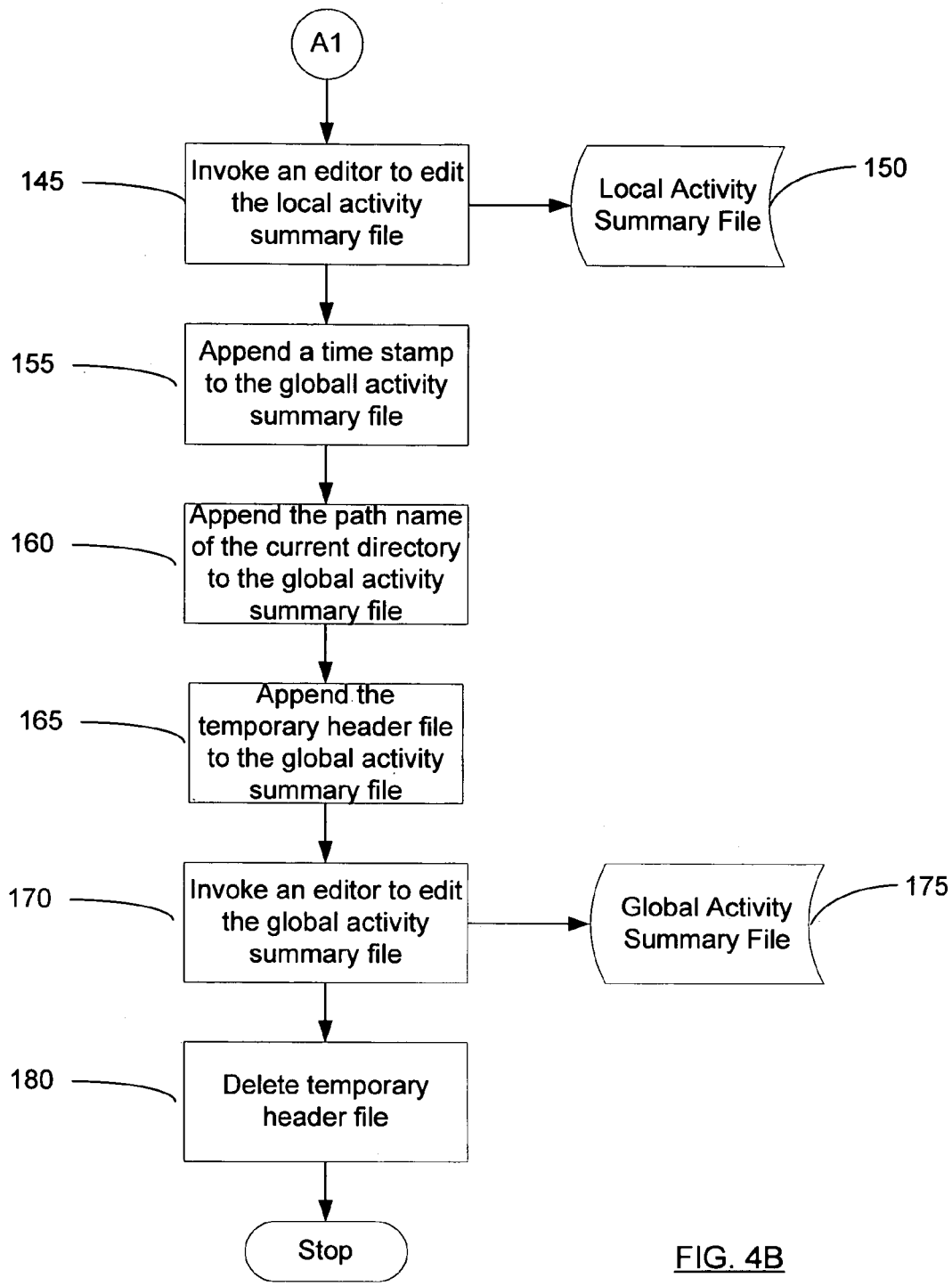

FIG. 4, comprised of FIG. 4A and FIG. 4B, illustrates the Activity Tracking with Menu Program (ATWM Program). This program enhances the Activity Tracking Program (AT Program) of the UDMGS system. At block 105, the ATWM Program receives from the GUI Program the name of the target file, the name of the command (program) that is to process the target file, and the name of the global activity summary file. The processing of the target file includes but not limited to creation, or editing, or viewing. At block 110, it calls the Check File Type Program. If the target file is an existing file, the Check File Type Program invokes the corresponding command to process it. After the call to the Check File Type Program is returned, in blocks 115 to 180 the ATWM Program invokes a component of the AT program to log the processing of the target file to the local activity summary file and the global activity summary file; or local activity summary table and global activity summary table if Relational Database Management System (RDBMS) is used. For each target file the folder that contains it corresponds to exactly one local activity summary file (or local activity summary table). As is shown in boxes 56 and 59 of FIG. 2, there are many global activity summary file (or global activity summary table.) An object data model that prescribes the rules of the design and implementation of local activity summary tables and global activity summary tables in RDBMS will be described in FIG. 14. The description of how the Check File Type Program handles the case that the target file is new is followed next.

FIG. 5 illustrates the Check File Type Program (CFT Program). At block 202, the CFT program receives the name of the target file and the name of the command from the ATWM Program. At block 204, it determines whether the target file exists or note. If the target file exists, at block 234 the CFT Program invokes the command to process the file. If the target file is a new file and thus does not exist, at block 206 the CFT Program initializes a variable key array containing variable pseudo names that are to be used by the createPrompt module to prompt and receive values of the variables from a user. As is illustrated in block 208, the CFT Program initializes the variable key array with pseudo names for menu file name, menu item name, item link (reference) name, and template file name. At block 210, it calls the createPrompt module to prompt and receive values of the variables from a user. The values are stored in a global variable named varData as a concatenated string with substrings separated by the semicolon character. At block 212, the CFT Program retrieves the string values of the menu file name, menu item name, item link name, and template file name from the variable varData. At block 214, the CFT Program appends a line that consists of string of the name of the menu item, the string of the name of the processing command concatenated with the string of the target file name as its argument, and the string of the link name to the end of the Menu Configuration file.

At block 216, the CFT Program determines whether the template file exists and is a text file. If the template file does not exist or is not a text file, at block 228 it checks whether the template file exists and is not a text file. If yes, then it copies the template file to the target file at block 230 and invokes the command to process the target file at block 234. If no, which implies that the template file does not exist, at block 232 it calls the createBlankFile Module to optionally copy a suitable default file to the target file and invokes the command to process the target file at block 234. Depending on the type of the target file, examples of the default file include but not limited to empty word processing file, spreadsheet file, and presentation file. If the template file exists and is a text file, at block 218 the CFT Program extracts the file type from the template file name. At block 220, the CFT Program calls the createFile module to create the target file from a modified version of the template file with its placeholders replaced by values given by a user. At block 222, the CFT Program checks whether the target file is of the type XML and the target file contains a reference to XSL. If it is not the case, at block 234 the CFT Program invokes the command to process the target file. If it is the case, at block 224 it extracts the name of the referenced XSL file from the content of the target file. At block 225, it copies the XSL file over from a predetermined default folder that contains the XSL file. At block 226, the CFT Program prepares a menu item line to view this XML file from a web browser. At block 227 it appends this menu item line to the menu file identified at block 212. At block 234, the CFT Program invokes the command to process this XML file. After considering all cases, at block 236 the CFT Program checks whether the target file is a WML file. If it is, at block 238 the CFT Program copies the target file to the virtual document directory of the web server to be viewed by wireless devices and returns to the calling ATWM Program. If it is not, the CFT Program returns directly to the calling ATWM Program.

In the ATWM Program, after the call to the CFT Program is returned for the case that the target file is new, in blocks 115 to 180 the ATWM Program invokes a component of the AT program to log the processing of the target file to the local activity summary file and the global activity summary file; or local activity summary table and global activity summary table if Database Management System (DBMS) is used As was described previously the first module that the CFT Program calls is the createPromt module if the target file does not exist. FIG. 6, comprised of FIG. 6A, FIG. 6B, and FIG. 6C illustrates the createPrompt module. The cratePrompt module receives from the calling program or module a variable key array that it will use to create a program that displays a dialog window to prompt a user to enter inputs for the variables identified in the variable key array. Examples of such variable key arrays include but not limited to that described in block 208 of FIG. 5. In this case, the variable key array is initialized in the CFT Program with pseudo names for menu file name, menu item name, item link name, and template file name. An optional array element that represents a pseudo name such as "only copying template file" indicating whether the template file should be directly copied to the target file or not may be added to the end of the variable key array. The createPrompt module creates a program that will display a dialog window to prompt a user to enter input values for menu file name, menu item name, item link name, and template file name. In general, at block 302, the createPrompt module opens the Dialog Frame Pseudo Program file for input. As is described in block 304, the Dialog Frame Pseudo Program is an incomplete software program containing placeholders for variable names, number of window panels, and height of window frame, respectively. Examples of programming languages that can be used to implement the software program include but not limited to Java, C#, or C++. An example, implemented in Java, for a line that contains placeholders for variable names is String               label#varName#Str="#varName#".replace('_', ' ');

where #varName# is the placeholder for variable name. At block 306, the createPrompt module opens the Dynamic Dialog Frame Program file for output. As is described in block 308, if the Dynamic Dialog Frame Program file exists, then it will be overwritten. An execution of the resulting Dynamic Dialog Frame Program will display a dialog window to prompt users for inputs and to collect them and return them to the calling module. At block 310, the createPrompt module calculates the value of the len variable as the size of the variable key array plus 1 (counting the OK button object at the bottom of the dialog frame). At block 312, it calculates value of the height variable as the product of the len variable with a preset height for a dialog panel.

From block 314 to block 332, the createPrompt module contains a program loop that reads the file of the Dialog Frame Pseudo Program line by line, makes changes to each line if necessary or makes no change, and appends the changed or unchanged line to the file of the Dynamic Dialog Frame Program. At block 314, the createPrompt module reads the first line of the Dialog Frame Pseudo Program. At block 316, it checks whether the end of the Dialog Frame Pseudo Program file is reached. If yes, then at block 334 it invokes the compiler command from the operating system platform to compile and link the Dynamic Dialog Frame Program file to an executable program file. If no, then at block 318, the createPrompt module checks whether the input line from file of the Dialog Frame Pseudo Program contains placeholders for the variable name. If the input line contains one, then at block 320 the createPrompt module replaces the placeholders by the corresponding value of the element of the variable key array and appends the new lines to the Dynamic Dialog Frame Program file, and at block 332 it reads the next line of the Dialog Frame Pseudo Program file and returns to block 316 for the next iteration in the loop. As was described earlier, an example, implemented in Java, for a line that contains placeholders for variable names is String      label#varName#Str="#varName#".replace('_', ' ');

where #varName# is the placeholder for variable name. Examples of the new lines resulted from replacing the placeholders by corresponding value of the element of the variable key array are String   labelMenu_File_NameStr="Menu_File_Name".replace('_', ' ');
    String labelMenu_Item_NameStr="Menu_Item_Name".replace('_', ' ');
    String                 labelLink_NameStr="Link_Name".replace('_', ' ');
    String labelTemplate_File_NameStr="Template_File_Name".replace('_', ' ');
    String labelOnly_Copying_Template_FileStr="Only_Copying_Template_File".replace('_', ' ');

If the input line contains no placeholder for the variable name, at block 322 the createPrompt module checks whether the line contains a placeholder for the number of window panels. If the input line contains one, then at block 324 the createPrompt module replaces the placeholder by the value of the len variable and appends the new line to the Dynamic Dialog Frame Program file, and at block 332 it reads the next line of the Dialog Frame Pseudo Program file and returns to block 316 for the next iteration in the loop. An example, implemented in Java, for a line that contains a placeholder for the number of window panels is container.setLayout( new GridLayout( #varCount#, 1));

where #varCount# is the placeholder for the number of window panels. An example of the new line resulted from replacing the placeholder by the value of the len variable is container.setLayout( new GridLayout( 6, 1));

If the input line contains no placeholder for the number of window panels, at block 326 the createPrompt module checks whether the line contains a placeholder for the height of the window frame. If the input line contains one, then at block 328 the createPrompt module replaces the placeholder by the value of the height variable and appends the new line to the Dynamic Dialog Frame Program file, and at block 332 it reads the next line of the Dialog Frame Pseudo Program file and returns to block 316 for the next iteration in the loop. An example, implemented in Java, for a line that contains a placeholder for the height of the window frame is setSize( 350, #1stHeight#);

where #1stHeight# is the placeholder for the height of the window frame. An example of the new line resulted from replacing the placeholder by the value of the height variable is setSize( 350, 210);

If the input line contains no placeholder for the height of the window frame, at block 330 the createPrompt module appends the input line without any change to the Dynamic Dialog Frame Program file, and at block 332 it reads the next line of the Dialog Frame Pseudo Program file and returns to block 316 for the next iteration in the loop. After all the lines of the Dialog Frame Pseudo Program file are read with corresponding changed or unchanged lines appended to the Dialog Frame Pseudo Program file, the Dialog Frame Pseudo Program file becomes a complete program file. At block 334 the createPrompt module invokes the compiler command from the operating system platform to compile and link the Dynamic Dialog Frame Program file to an executable program file. At block 336, it executes the executable program file and stores the output in the global variable named varData. As is described in block 338, this output contains a string of the user input for all text field objects on the dialog frame window created by the execution of the executable Dynamic Dialog Frame Program file. In the string, the user's input for two adjacent text field objects are separated by a delimiter character such as but not limited to the semicolon character. A more detailed description of the Dynamic Dialog Frame Program is followed next.

Figure 7A:
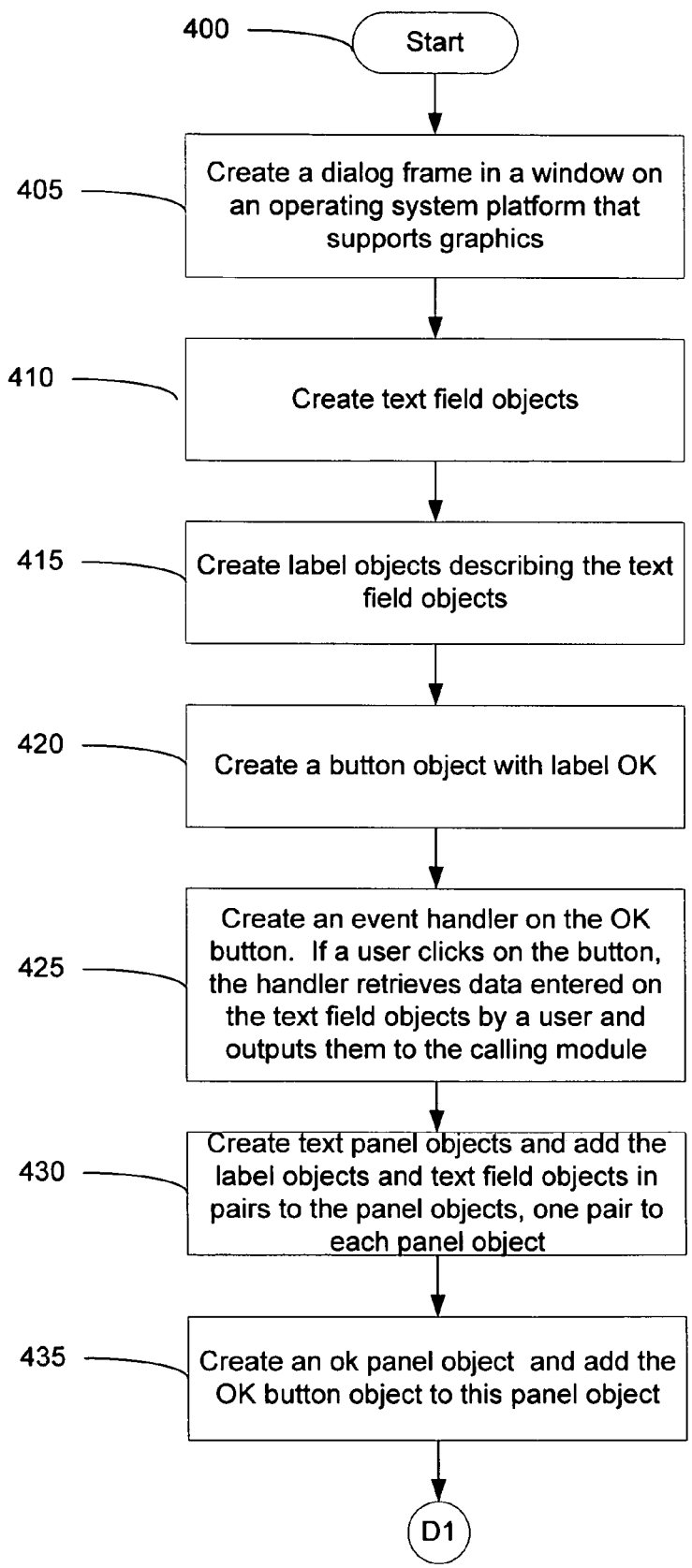
Figure 7B:
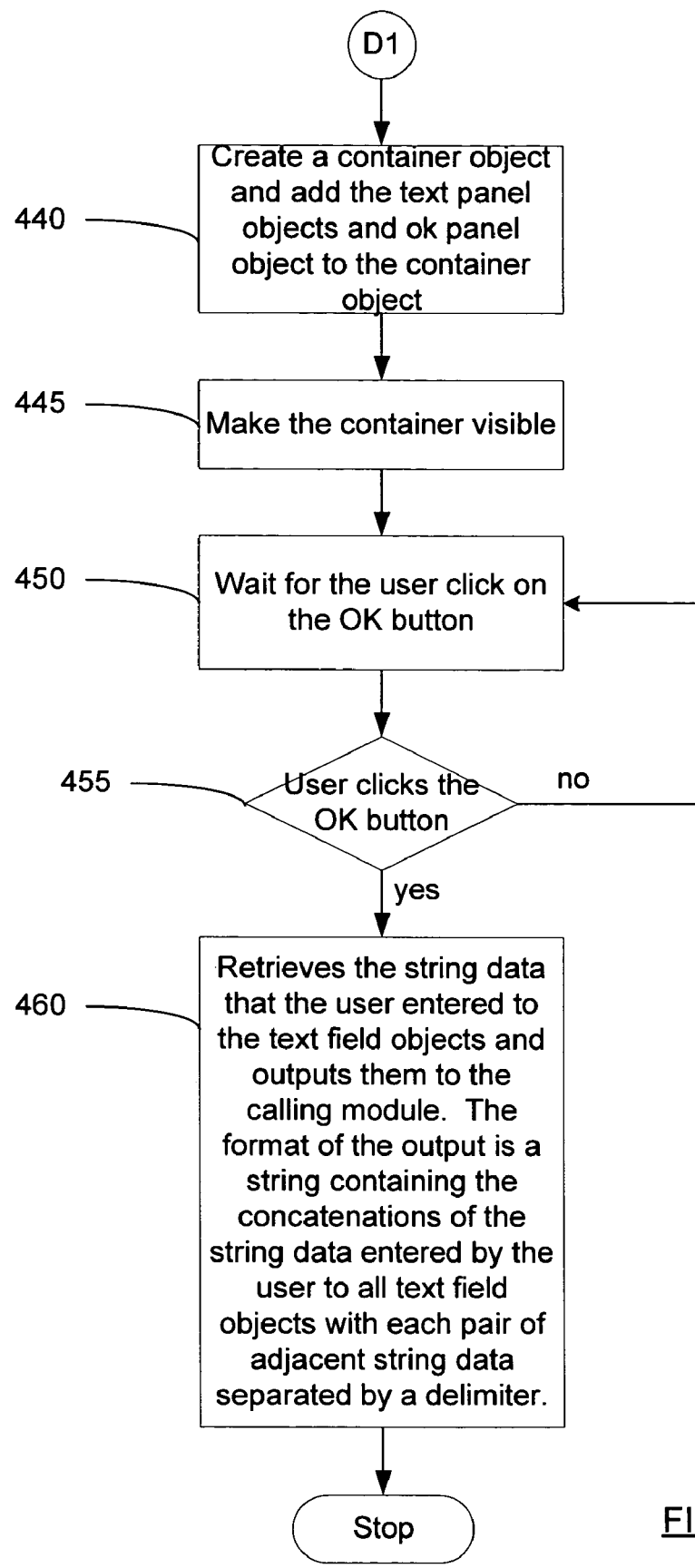

As was described previously the main function of the createPrompt module is to generate an executable Dynamic Dialog Frame Program file, execute it to display a dialog window to collect users' input, and store them in the global variable named varData. FIG. 7, comprised of FIG. 7A and FIG. 7B, illustrates the Dynamic Dialog Frame Program (DDF Program). At block 405, the DDF Program creates a dialog frame window on an operating system platform that supports graphics. At block 410, it creates text field objects. At block 415, it creates label objects describing the text field objects. At block 420, it creates a button object with label OK. At block 425, the DDF Program creates an event handler on the OK button such that if a user clicks on the button, this event handler retrieves data entered on the text field objects by a user and outputs them to the calling module. At block 430, it creates text panel objects and adds the label objects and text field objects in pairs to the panel objects, one panel object for each pair. At block 435, it creates an ok panel object and adds the OK button object to this panel object. At block 440, the DDF Program creates a container object and adds the text panel objects and ok panel object to the container object. At block 445, it makes the container object visible. At blocks 450 and 455, it waits for the user to enter data to the text field objects and clicks the OK button. After the user clicks the OK button, at block 460 the DDF Program retrieves the string data that the user entered to the text field objects and outputs them to the calling module. The format of the output is a string containing the concatenations of every string data entered by the user to each text field object with each pair of adjacent string data separated by a delimiter such as but not limited to the semicolon character.

As was described previously, at block 210 of FIG. 5, the CFT Program calls the createPrompt module to prompt a user to enter string values for the menu file name, menu item name, item link name, and template file name. At block 336 of FIG. 6 the createPrompt module in turn executes the executable DDF Program file and stores the user's inputs for the string values in the global variable named varData. At block 212 of FIG. 5, the CFT Program retrieves the string values of the menu file name, menu item name, item link name, and template file name from the string value of the global variable varData. As was discussed previously an optional prompt message for "only copying template file" that requests the user to answer with Y (yes) or N (no) indicating whether the template file should be directly copied to the target file or not may be added to the dialog window displayed by the execution of an executable DDF Program file, which is generated at block 336 of FIG. 6, and the user's answer is added to the end of the string value for the variable varData. FIG. 8 illustrates such a dialog window. At block 500, the DDF Program displays the text field object for the menu name. At block 502, it displays the text field object for the menu item name. At block 504, it displays the text field object of the item link name. At block 506, the DDF Program displays the text field object of the template file name. At block 508, it displays the text field object that receives the user's answer to the prompt "Only Coping Template File".

Figure 9A:
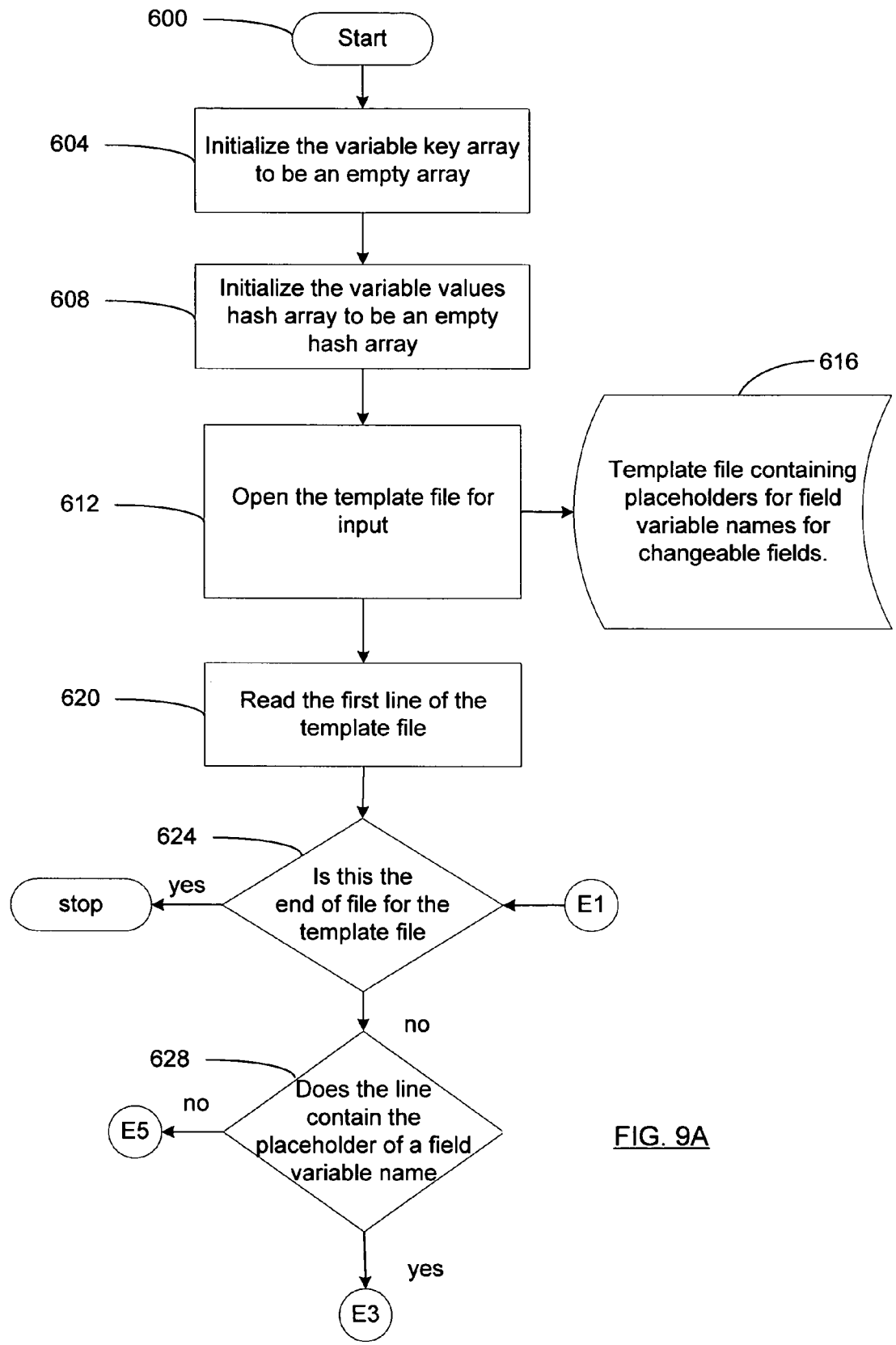
Figure 9B:
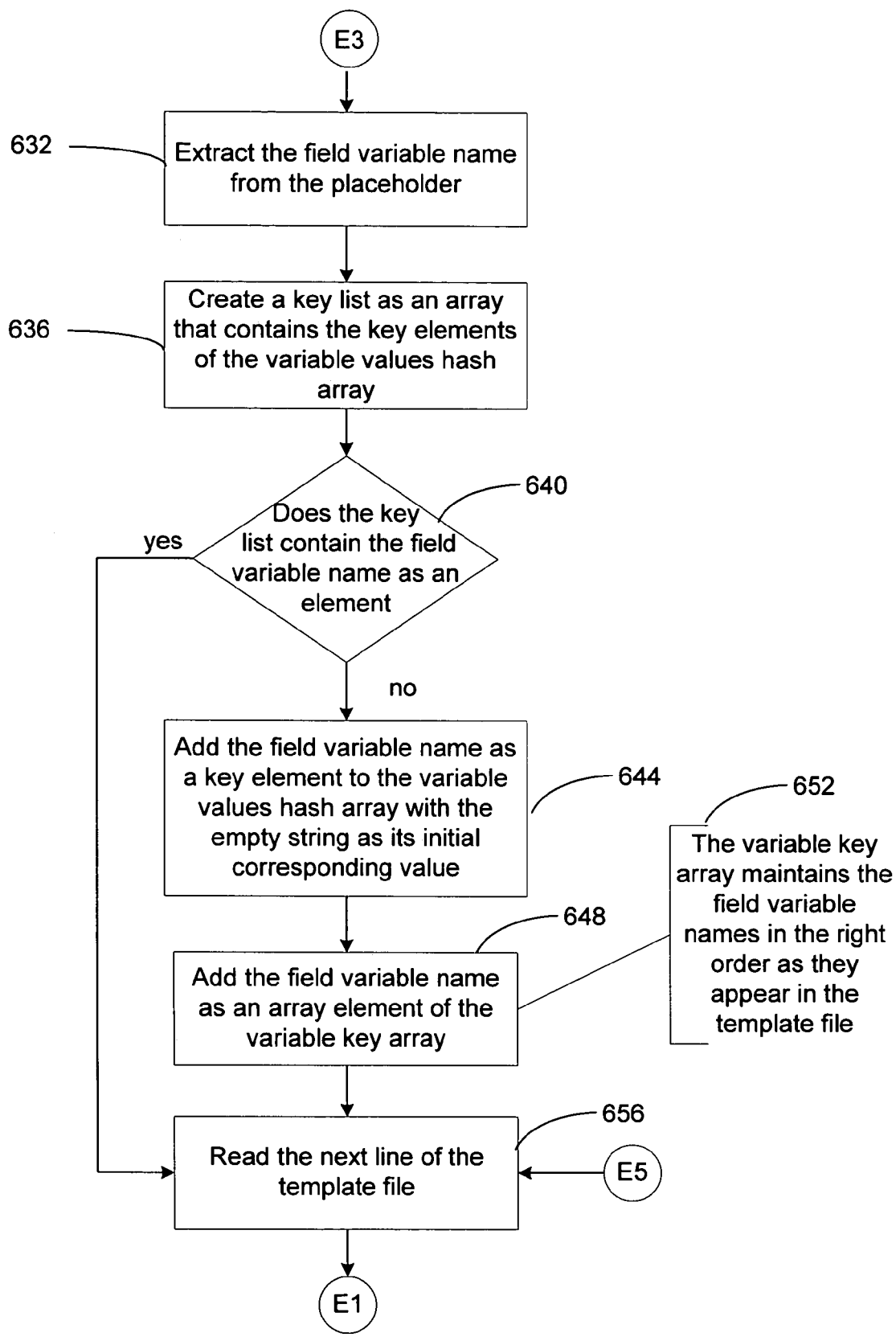

As was discussed in the description for FIG. 5, the second module that the CFT Program calls is the createFile module if the target file does not exist and if the template file exists and is a text file. As is shown in boxes 20 and 22 of FIG. 1, the only module that the createFile module calls is the getKeyValue module. At this point, the description of the getKeyValue module is presented next and the description of the createFile module will be presented following it. FIG. 9, comprised of FIG. 9A and FIG. 9B, illustrates the getKeyValue module. In block 604, the getKeyValue module initializes the global variable key array to be an empty array. In block 608, it initializes the global variable values hash array to be an empty hash array. As is shown in boxes 22 and 15 of FIG. 1, and in block 612, the getKeyValue module opens the template file for input. As is described in box 616, the template file contains placeholders with field variable names (or identifications) for changeable fields. Before the further description of the getKeyValue module, changeable fields and placeholders in a template file are described in more details next.

A changeable field of a template file is named from an internal point of view. It has a field variable name and identifies a field location in the template file. All changeable fields need to be replaced to transform the template file to a real document. A placeholder of a template file is named from an external point of view. Placeholders are ways to represent the changeable fields so that a computer program can be developed to detect them and replace them. The following is an example of a template file in its simplest form for a travel expense report:

| | |
|---|---|
| Employee | ==name== |
| Date | ==date== |
| Client | ==client name== |
| Meals | ==meals cost== |
| Gas | ==gas cost== |

The five fields on the left side are unchangeablefields. They represent the static structure of the document in the form of but not limited to plain alphanumerical strings. For example, static tag names of XML or WML may also appear on the left side. The five fields on the right side are changeable fields. They identify the field locations that need to be replaced. Placeholders are ways of representing changeable fields. Here there are five placeholders on the right side, representing the filed variable names (or identifications) preceded by but not limited to ==(two = characters) and trailed by ==. For example, ==name== is a placeholder and name is a field variable name. There are other ways to represent the five fields such as using ** instead of ==. Placeholder values (or fill-in values) are the user input values that replace the changeable fields to transform the template file to a real document, which represents the initial version of the target file. A more complex example of a template file such as but not limited to XML file format may contain a line with static tag and placeholder like:
<empName value="==var==Name==eva=="/>

In the above example, field variable names (or identifications) are preceded by the character string "==var==" and followed by the character string "==evar==".

From blocks 620 to 656 of FIG. 9A and FIG. 9B, respectively, the getKeyValue module contains a program loop that reads the template file line by line. At block 620, it reads the first line. At block 624, it checks whether the end of the template file is reached. If yes, then it returns to the caller. If no, then at block 628 it checks whether the line contains the placeholder of a field variable name (or identification). If the line does not contain any placeholder, then at block 656 the getKeyValue module reads the next line of the template file. If the line contains the placeholder of a filed variable name, then at block 632 the getKeyValue module extracts the string value of the field variable name from the placeholder on the line. (The discussion here is for at most one placeholder per line. But the approach of the method is not limited to it.) At block 636 it creates a key list as an array that contains the key elements of the variable values hash array. At block 640 it checks whether the key list contains the string value of the field variable name as an element. If yes, then at block 656 it reads the next line of the template file. If no, then at block 644 it adds the string value of the field variable name as a key index element to the variable values hash array with the empty string as its initial corresponding value. At block 648 the getKeyValue module adds the string value of the field variable name as an array element of the variable key array. As is commented in box 652, the variable key array contains the string values of the filed variable names (or identifications) as its array elements in the right order as they appear in the template file. At block 656, getKeyValue module reads the next line in the template file.

Figure 10A:
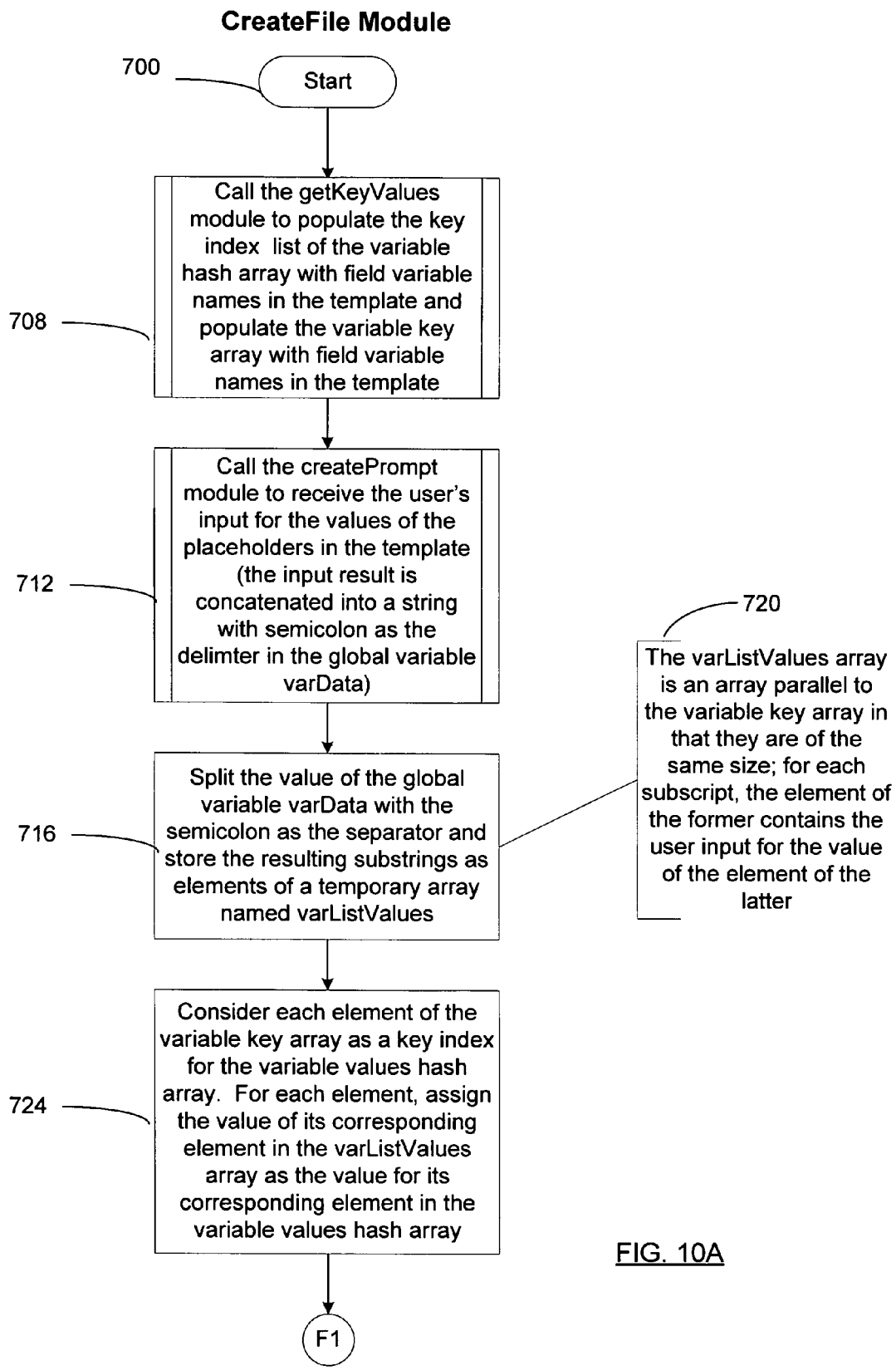
Figure 10B:
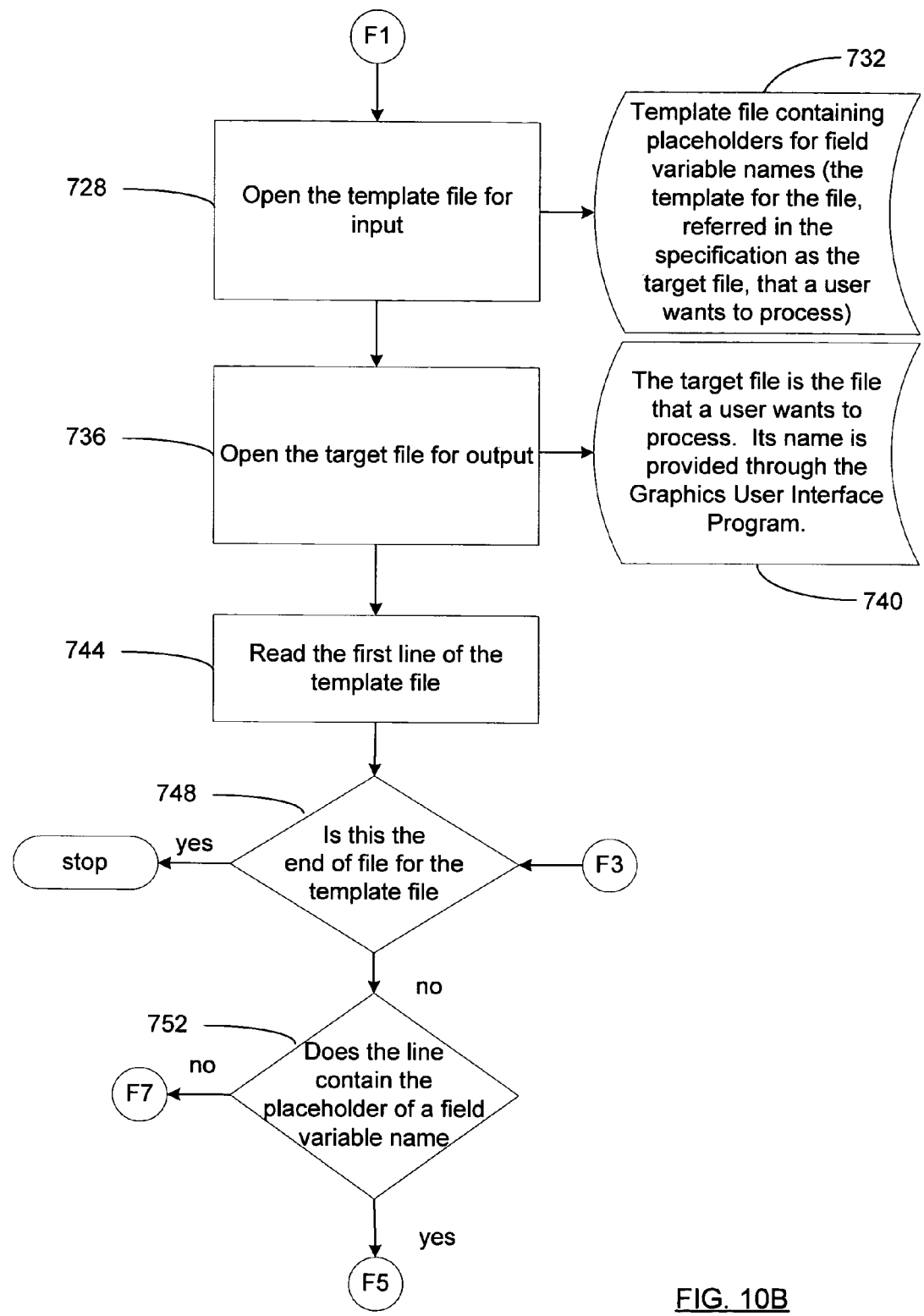
Figure 10C:
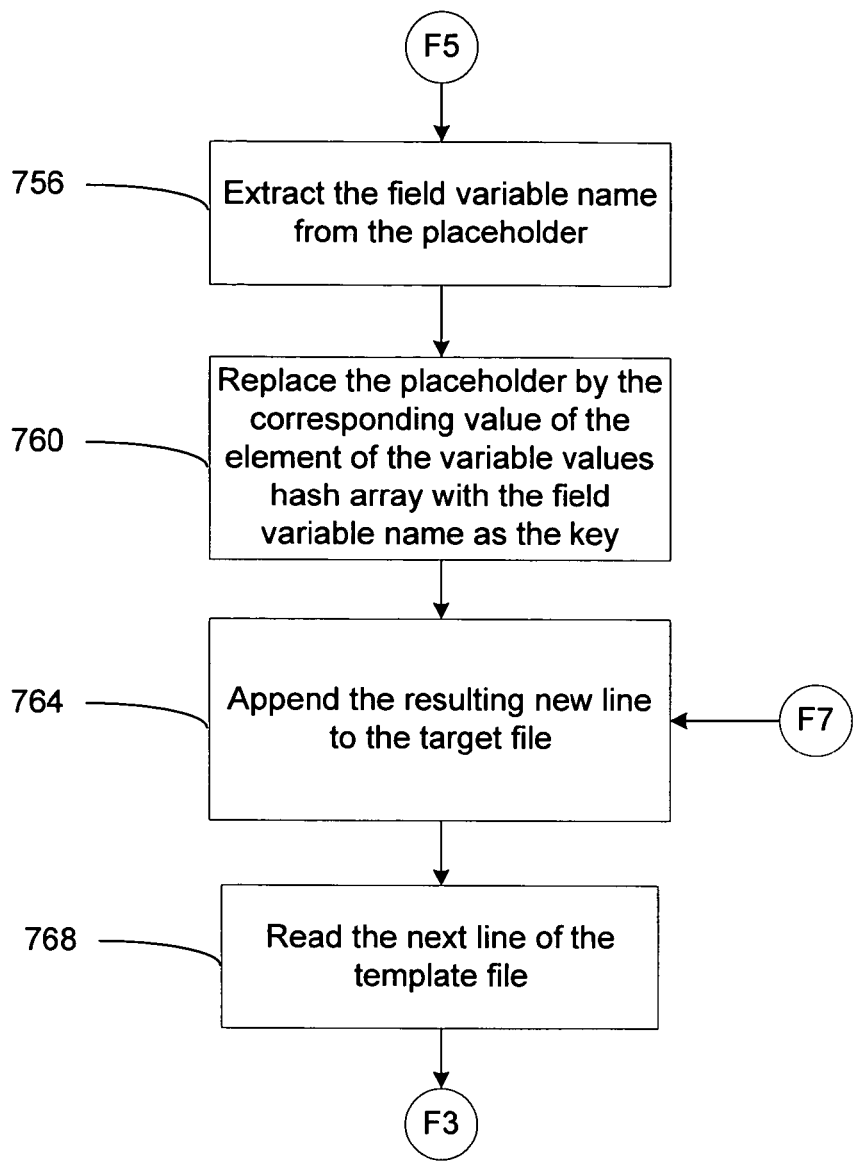

As was discussed before, the second module that the CFT Program calls is the createFile module if the target file does not exist and if the template file exists and is a text file. As was also discussed before, the description of the createFile module follows the description of the getKeyValue module, which was just presented. FIG. 10, comprised with FIG. 10A, FIG. 10B, and FIG. 10C, illustrates the createFile module. At block 708 the createFile module calls the getKeyValues module to calls the getKeyValues module to populate the key index element list of the variable hash array with the string values of the filed variable names (or identifications) in the template and populate the variable key array with the same string values of the filed variable names (or identifications) in the template. At block 712 it calls the createPrompt module to display a dialog window with the string values of the filed variable names (or identifications)

as labels and prompt for and receive the user's input for the placeholders' values in the template. It concatenates the placeholders' values into a single string with each pair of adjacent placeholder values (or fill-in values) being separated by a delimiter character such as the semicolon character ";" in the global variable varData. At block 716 the createFile module splits the value of the global variable varData with the semicolon character ";" as the separator and stores the resulting substrings as elements of a temporary array named varListValues. As is commented in the box 720, the varListValues array is an array parallel to the variable key array, which, as can be recalled, was populated with string values of the template file's filed variable names (or identifications) as its array elements by the getKeyValue module, in that they are of the same size. For each subscript, the element of the varListValues array contains the user input value for the value of the placeholder in the template file that corresponds to the element of the variable key array, which is the string value of a variable key name. At block 724, the createFile module considers each element of the variable key array as a key index for the variable values hash array. For each element of the variable key array, it assigns the value of its corresponding element in the varListValues array as the value for its corresponding element in the variable values hash array. Thus the variable values hash array contains the key-value pairs in that each key index contains the string value of a field variable name and that the corresponding value is the user's input value that replaces the placeholder at the location of the field variable in the template file.

At block 728, the createFile module opens the template file for input. As was discussed in the description for FIG. 9 for the getKeyValue module at box 616 and as is commented in box 732, the template file contains placeholders at the locations of filed variable names (or identifications) representing changeable fields. At block 736, the createFile module opens the target file for output. As is commented in box 740, the target file is the file that a user wants to process. Its name is provided through the Graphics User Interface Program. From block 744 to block 768, the createFile module contains a program loop that reads the template file line by line. At block 744, it reads the first line of the template file. At block 748, it checks whether the end of the template file is reached. If yes, then it returns to the calling module. If no, then at block 752, it checks whether the line contains the placeholder of a field variable name. If the line does not contain the placeholder of a field variable name, then at block 764 it appends the line unchanged to the target file. At block 768 it reads the next line from the template file and returns to block 748 to check whether the end of the template file is reached. If the line does contain the placeholder of a field variable name, then at block 756 the createFile module extracts the field variable name from the placeholder. At block 760 it creates a new line by replacing the placeholder by the corresponding value of the element of the variable values hash array with the extracted field variable name as the key index. At block 764 it appends this new line to the target file. At block 768 it reads the next line from the template file and returns to block 748 to check whether the end of the template file is reached.

An example of a dialog window generated as a result of the calls to the getKeyValue module at block 708 and to the createPrompt module at block 712 is illustrated in FIG. 11 with the template file in XML format that is described below.
<?xml version ="1.0"?>
<?xml:stylesheet type ="text/xsl"href="expense.xsl"?>
<!-- Expense Template -->

```
<expense>
   <empName value="==var==Name==evar=="/>
   <expDate value="==var==Date=evar=="/>
   <item amount "==var==Meal_Amount==evar==">
      <name>Meal</name>
      <description>
         Meal expense
      </description>
   </item>
   <item amount ="==var==Gas_Amount==evar==">
      <name>Gas</name>
      <description>
         Gasoline expense
      </description>
   </item>
   <item amount ="==var==Other_Amount==evar==">
      <name>Other Expense for ==var==Name==evar==</
         name>
      <description>
         Other expense
      </description>
   </item>
</expense>
```

In this file, the string values of the variable names are Name, Date, Meal_Amount, Gas_Amount, and Other_Amount. The corresponding placeholders are the strings of the format: ==var==variable name==evar, where variable name is one of these five string values. The getKeyValue module stores these five string values as key index values of the variable values hash array. It also stores them as elements of the variable key array. The createPrompt module displays the dialog window in FIG. 11. It creates the label Name from converting the string value of the first element of the variable key array, which is the string "Name", and displays this label at 800. It creates the label Date from converting the string value of the second element of the variable key array, which is the string "Date", and displays this label at 804. It creates the label Meal Amount from converting the string value of the third element of the variable key array, which is the string "Meal_Amount", and displays this label at 808. It creates the label Gas Amount from converting the string value of the fourth element of the variable key array, which is the string "Gas_Amount", and displays this label at 812. It creates the label Other Amount from the value of the five element of the variable key array, which is the string "Other_Amount", and displays this label at 816. After the user inputs the values for the five fields: "Smith, Jack" at 820, "08/13/04" at 824, "15.56" at 828, "9.79" at 832, and "3.28" at 836, respectively, the createPrompt module coverts the input values into a single string "Smith Jack;08/13/04; 15.56;9.79;3.28" and stores it in the global variable varData. At block 716 and 714, the createFile module splits the string value of the variable varData and populates the variable values hash array with the following key-value pairs: "Name"-"Smith, Jack", "Date"-"08/13/04", "Meal_ Amount"-"15.56", "Gas_Amount"-"9.79", and "Other_ Amount"-"3.28". At block 756 and 760, for a line of the template file that contains a placeholder, the createFile module creates a new line in the target file by extracting the field variable name from the placeholder and replacing the placeholder by the value corresponding the key index that has the string value of the field variable name. For example, from the line in the template file:

```
<empName value="==var==Name==evar=="/>
``` the following line is generated for the target file:

```
<empName value="Smith, Jack"/>
```

From block 744 to block 768 of FIG. 10, the program loop of the createFile module generates from the template file the complete target file with the following content:

```
<?xml version ="1.0"?>
<?xml:stylesheet type ="text/xsl"href="expense.xsl"?>
<!--Expense Template -->
<expense>
   <empName value="Smith, Jack"/>
   <expDate value="08/13/2004"/>
   <item amount ="15.56">
      <name>Meal</name>
      <description>
         Meal expense
      </description>
   </item>
   <item amount ="9.79">
      <name>Gas</name>
      <description>
         Gasoline expense
      <description>
   </item>
   <item amount="3.28">
      <name>Other Expense for Smith, Jack</name>
      <description>
         Other expense
      </description>
   </item>
</expense>
```

Figure 5C:
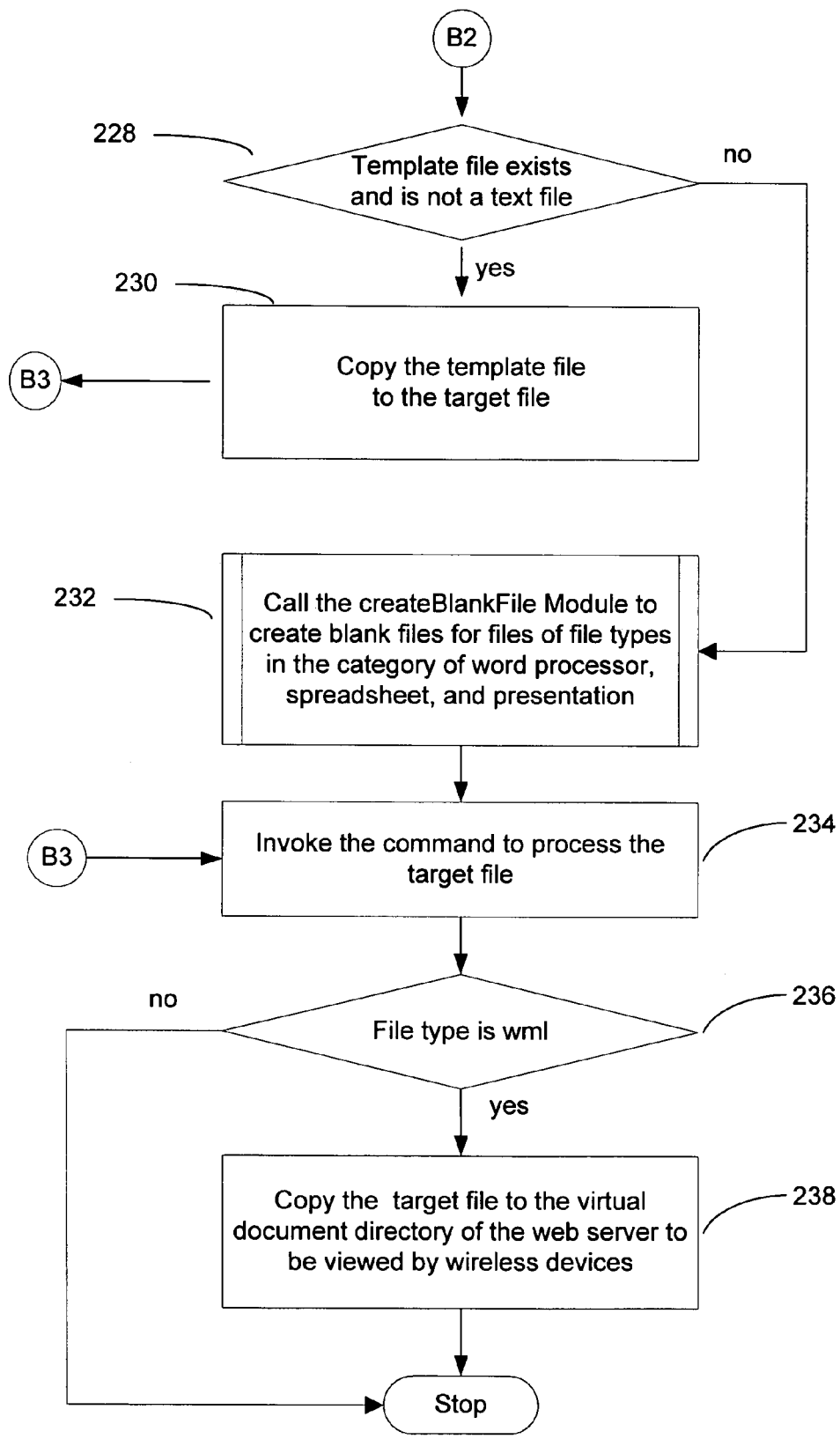
Figure 6A:
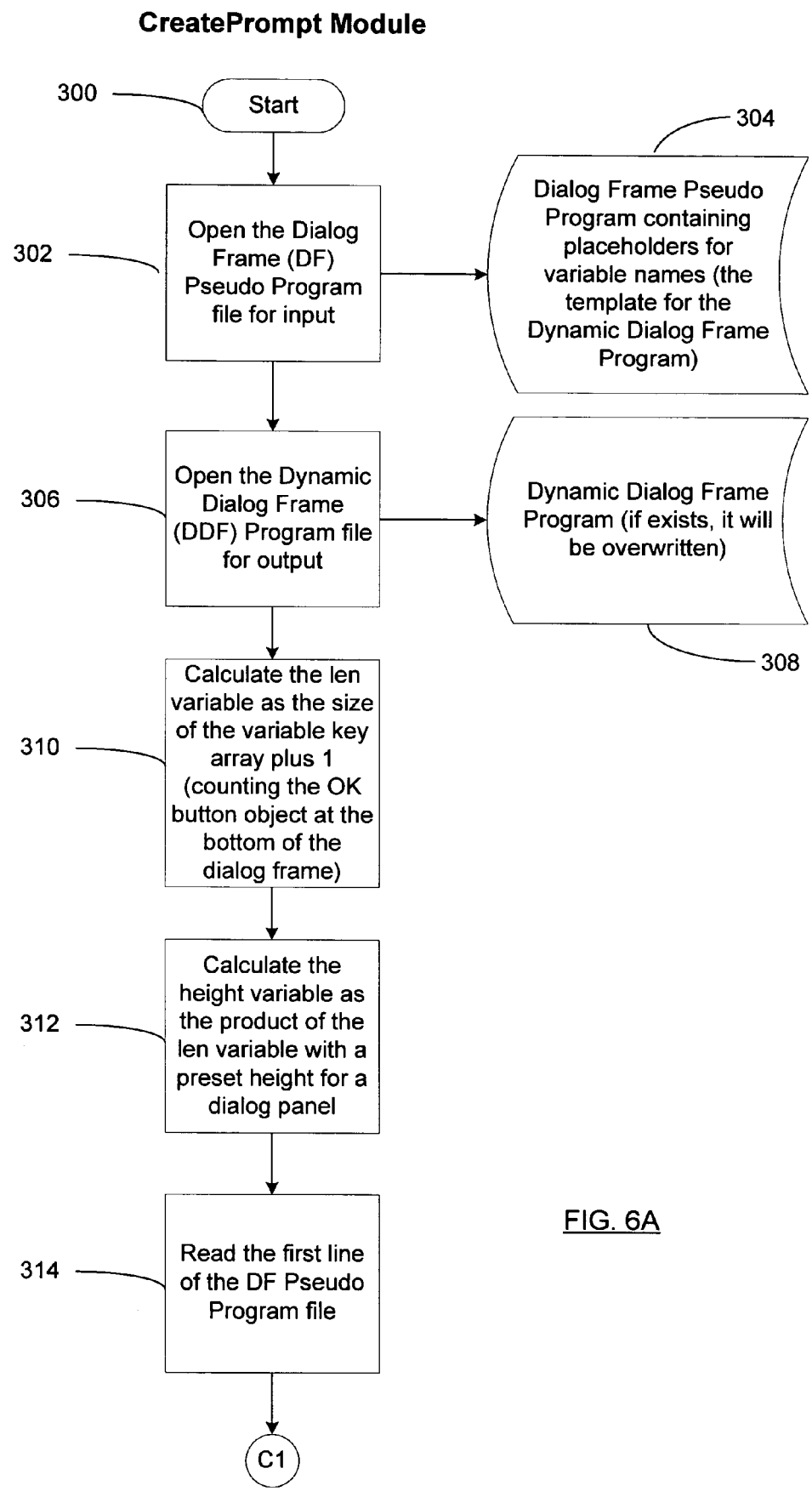
Figure 6B:
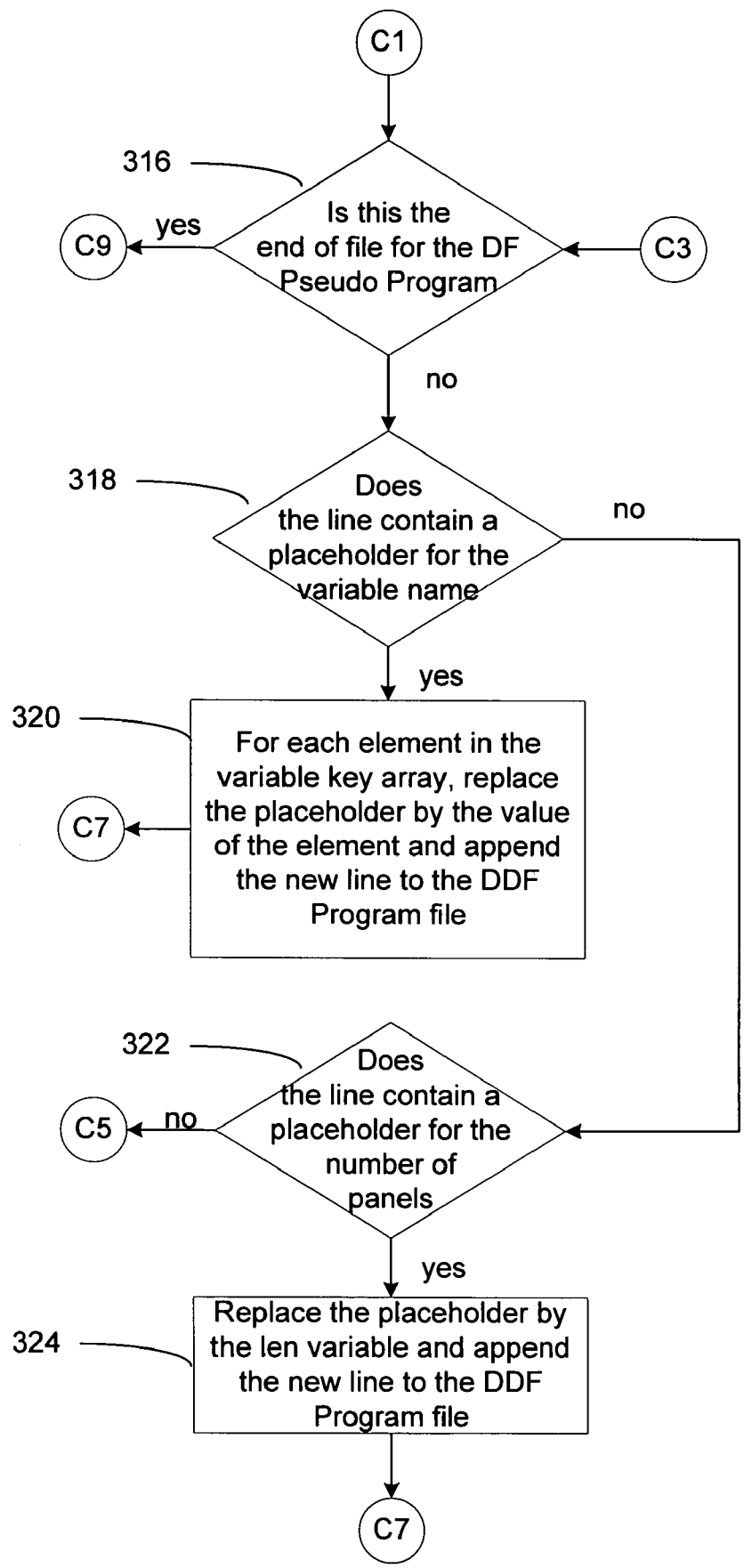
Figure 6C:
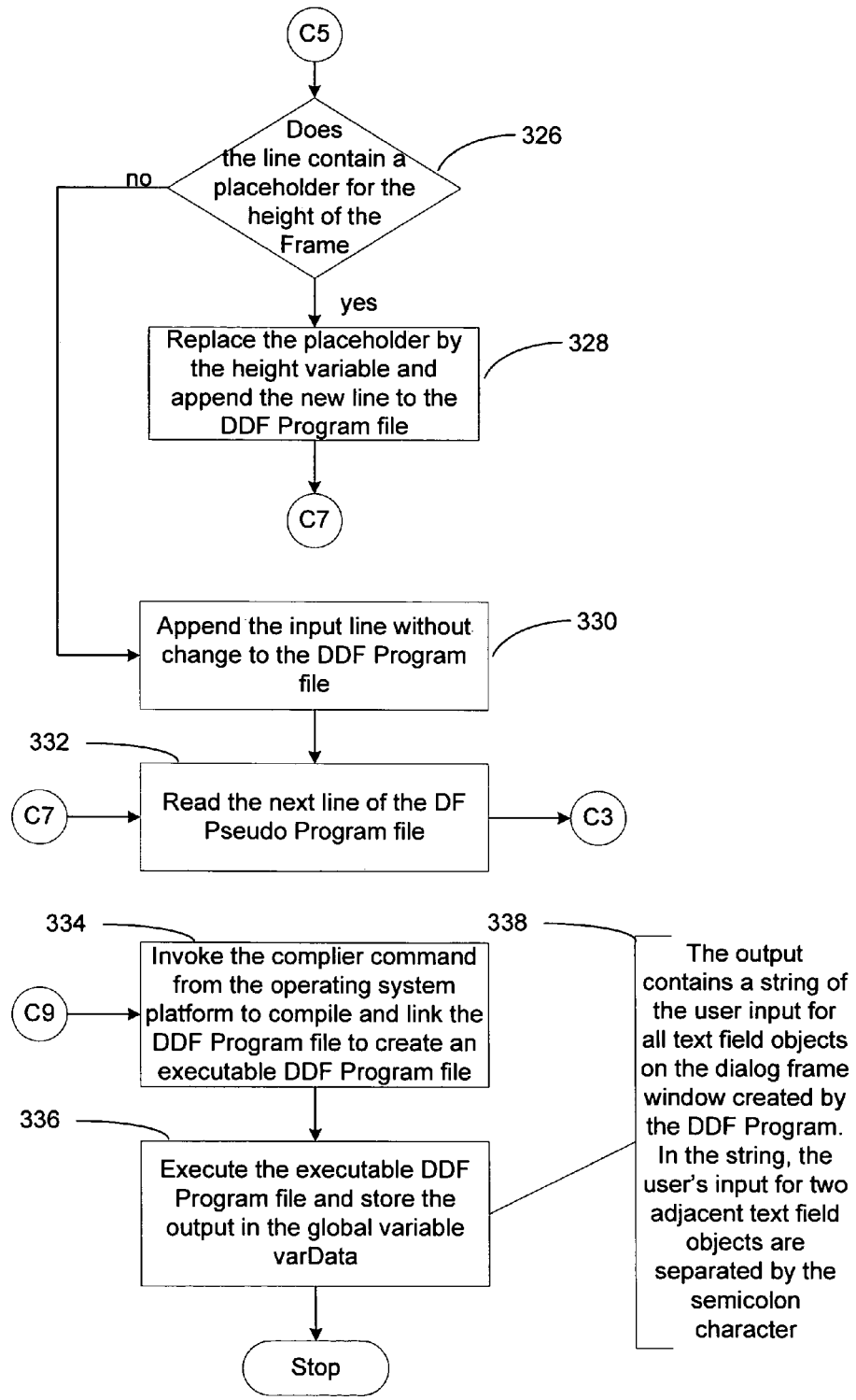

As was illustrated at boxes 18 and 30 of FIG. 1 and at block 232 of FIG. 5C, the Check File Type Program (CFT Program) calls the createBlankFile module. As was discussed previously for Figure and the CFT Program, the createBlankFile module is called if the template file does not exist. FIG. 12 illustrates the createBlankFile module. The createBlankFile module creates an empty new target file, of which the file type is in the category of certain file types, to drop warning messages for some application programs if the target files that they are to process do not exist. At block 905, it determines the file type of the target file based on name of the target file and on the command, the application program that is to process the target file. At block 915, it checks whether a blank file is available for this file type in the default folder that contains blank files of various types; for example, word processing file, spreadsheet file, and presentation file and so on. If no, then it returns to the calling program, which is the CFT Program. If yes, then it copies the blank file to the target file and returns to the CFT Program.

As is described in box 51 of FIG. 2, the Graphics User Interface Program (GUI Program) displays the View menu on the menu bar. FIG. 13 illustrates the menu items if a user clicks on the View menu at 1000. Three menu items are displayed: View Local Activity Summary at 1005, View Global Activity Summary at 1010, and View History of Global Activity Summary at 1015, respectively. If the user clicks the View Local Activity Summary menu item, the GUI Program displays in a new window the local activity summary file located in the folder where the last target file was processed. If the user clicks the View Global Activity Summary menu item, the GUI Program displays in a new window the Global Activity Summary file whose file name was selected by the user and is displayed at box 56 of FIG. 2. If the user clicks the View History of Global Activity Summary menu item, the GUI Program displays in a new window the names of the Global Activity Summary files that have been modified by the ATWM Program and the timestamps of the events of these modifications.

As was discussed for the ATWM Program illustrated by FIG. 4, the local activity summary file and global activity summary file may be replaced by local activity summary table and global activity summary table, respectively, if Relational Database Management System (RDBMS) is used. FIG. 14 illustrates a Database Object Model Diagram that guides a design and implementation of a database that contains local activity summary tables and global activity summary tables. At box 1100, the object class GlobalActivityTableList represents the names of all global activity summary tables. At box 1105, the object class LocalActivitySummary represents the directory (folder) paths corresponding to local activity summary tables. In object-oriented modeling methodology, there is a many-to-many association between the two object classes: GlobalActivityTableList and LocalActivitySummary and thus the association becomes an association class named as GlobalActivitySummary, which, shown at box 1110, represents the logging of processing of target files globally. At box 1115, the object class LocalActivitySummaryData represents the logging of processing of target files locally. There is a one-to-many association between the two classes: LocalActivitySummary and LocalActivitySummaryData. At box 1125, the object class TargetFile represents the names of all target files that were processed before. There is a one-to-many association between the two classes: TargetFile and LocalActivitySummaryData. At box 1120, the object class SummaryOfUpdate represents the summaries and optional details of the processing of the target files. There is a one-to-many association between the two classes: TargetFile and SummaryOfUpdate. This object model illustrated in FIG. 14 specifies that in the implementation to RDBMS, all the six classes represented by boxes 1100 to 1125 should be implemented as database tables.

FIG. 15 describes the drop down menu when a user clicks on the Tools menu on the menu bar at 52 of FIG. 2 and at 1200 of FIG. 15. The drop down menu contains three menu items: Run Automenu, Run Search, and Run Merge shown at 1205, 1210, and 1215, respectively. The menu item: Run Automenu starts the user driven menu program of the UDMGS system. A menu file such as but not limited to that shown at box 500 of FIG. 8 may be used as the menu configuration file for this user driven menu program. The menu item: Run Search starts the search program of the UDMGS system. The menu item: Run Merge starts the merge program of UDMGS system.

Hardware Platforms. It is assumed that those in the art should understand that the systems and methods of the present invention are, in the usual concept of software-based implementation, considered to be an application. In this view, the systems and methods of the present invention may be implemented as one or more applications on any suitable hardware platform(s) operated under the control of any suitable operating system(s).

Further Description Not Needed. The systems and methods of the present invention need not be further described here since those experienced in the art, based on the teachings of the present invention, will promptly understand how to implement the same. This is partly due to the widespread use of conventional operating systems and commands and command aliases therein to initiate the execution of various application programs to process files. The systems and methods of the present invention may be used on distributed computer systems, such as local area networks (LANs), wide area networks (WANs), wireless networks and Internet based networks. The common knowledge about and use of various commands and command aliases to invoke application programs to process files as just noted between computers on such networks makes it unnecessary to further describe the details of the protocols of these commands and command aliases. Furthermore, any suitable programming approach and any known communications and database protocols and software tools familiar to those writing software programs and related commands may be applied to implement the systems and methods of the present invention. These programming approaches include but not limited to using object-oriented programming components and relational databases. In addition, the systems and methods of the present invention may be implemented as a collection of interrelated programs or modules/routines in any suitable programming language (or collection of languages) such as but not limited to object-oriented programming languages.

The present invention has been described in part by reference to block diagrams, flow chart diagrams and elements of systems and steps of methods. As is well known, suitable program instructions or coding provided in software are used to convert general purpose computers and/or processors into programmed computers and/or processors to form systems capable of implementing a specific application, such as the descriptions of the present invention.

Tangible Media as an Implementation. In addition, the software or other coding used to implement the present invention may be provided in any suitable form of computer program code embodied in tangible media, such as but not limited to removable storage media, including floppy diskettes and CD-ROMs, hard drives, tape drives, static or flash memory, or any other computer readable storage medium. When such computer program code or other code, containing the needed instructions, is loaded into and is ready for execution by suitable computers/processors, such programmed computers/processors become an apparatus for practicing the invention. Therefore, it should be understood that another embodiment of the present invention is the computer program code needed for implementing the processes of the present invention when it is embodied in a tangible medium.

The forgoing detailed description shows that the exemplary embodiments of the present invention are well suited to fulfill the purposes above-stated. It is recognized that those skilled in the art may make a variety of modifications or additions to the embodiments chosen to illustrate the present invention without departing from the spirit and proper scope of the invention. Therefore, it is to be understood that the protection sought and to be afforded hereby should be deemed to extend to the subject matter defined by the appended claims, including all fair equivalents thereof.

The invention claimed is:

1. A file generation system, comprising:
  program codes stored in a computer readable media that when executed is configured to:
  provide a first interface configured to receive from the user:
    a selection of an activity summary data repository for storing tracking information related to the user's invoking at least one operating system command and/or at least one application program;
    a selection of a location where a target file is to reside;
    an identifier for the target file;
    a selection of an operating system command or application program that can be used to process the target file;
  provide a user interface via which a user can select a previously created template file that includes changeable content, including changeable fields comprising at least a first changeable field, and that includes non-changeable content;

parse a structure of the template file selected by the user and extract identifications of the changeable fields and rules that specify data types in the changeable content;

use such identifications as prompting labels to dynamically generate an information exchange user interface via which the user can enter new data for the changeable fields;

receive the new data entry from the user and store the new data in computer readable memory; and receive the new data entry from the user and store the new data in computer readable memory; and generate the target file.

2. The system as defined in claim 1, wherein the activity summary data repository is a global activity summary data repository that tracks activities related to a plurality of target files created for a first purpose.

3. The system as defined in claim 1, wherein the activity summary data repository is a local activity summary data repository that tracks activities related to the target file, wherein the target file corresponds to exactly one local activity summary file.

4. The system as defined in claim 1, wherein the information exchange user interface includes a dialog frame window.

5. The system as defined in claim 1, wherein the information exchange user interface includes menu configuration information.

6. The system as defined in claim 1, wherein the program code is further configured to:

open an incomplete software program containing placeholders for variable names, number of window panels, and window frame height; and replace the placeholders with label names obtained from a predetermined fix-sized set of static prompting labels used to prompt the user to provide inputs for menu configuration information and/or template file name, or replace the placeholders with label names obtained from a non-fixed sized set of prompting labels that are dynamically extracted as identifications for changeable fields from the user-selected template file, and store the software program with the replacements for the placeholders.

7. The system as defined in claim 1, wherein the program code is further configured to:

receive a user instruction to convert at least one template file into an HTML file; and at least partly in response to the user instruction, convert the at least one template file into an HTML file.

8. The system as defined in claim 1, further comprising at least one markup language-based template file.

9. The system as defined in claim 1, further comprising a Structured Query Language (SQL)-based template file, an Extensible Markup Language (XML)-based template file, and/or a Wireless Markup Language (WML)-based template file.

10. The system as defined in claim 1, further comprising a text file type-based template file.

11. A method for generating a file, comprising:

providing a user interface via which a user can select an activity summary data repository for storing tracking information related to the user's invoking at least one operating system command and/or at least one application program;

providing a user interface via which a user can select a location where a target file is to reside and an identifier for the target file;

providing a user interface via which a user can select an operating system command or application program that can be used to process the target file;

providing a user interface via which a user can select a previously created template file that includes changeable content, including changeable fields comprising at least a first changeable field, and non-changeable content;

parsing a structure of the template file selected by the user;

extracting identifications of the changeable fields and rules that specify data types in the changeable content within the selected template;

using such identifications in providing prompts in the dynamic generation of an information exchange user interface via which the user can enter new data for the changeable fields;

receiving the new data entry from the user;

storing the new data in computer readable memory;

presenting at least one user interface to the user that includes the new data; and generating the target file.

12. The method as defined in claim 11, wherein the activity summary data repository is a global activity summary data repository that tracks activities related to a plurality of target files created for a first purpose.

13. The method as defined in claim 11, wherein the activity summary data repository is a local activity summary data repository that tracks activities related to the target file, wherein the target file corresponds to exactly one local activity summary file.

14. The method as defined in claim 11, wherein the information exchange user interface includes a dialog frame window.

15. The method as defined in claim 11, wherein the information exchange user interface includes menu configuration information.

16. The method as defined in claim 11, the method further comprising:

opening an incomplete software program containing placeholders for variable names, number of window panels, and height of window frame; and replacing the placeholders with label names obtained from:

a pre-determined fix-sized set of static prompting labels used to prompt the user to provide inputs for menu configuration information, and/or template file name, or from a non-fixed sized set of prompting labels that are dynamically extracted as identifications for changeable fields from the user-selected template file.

17. The method as defined in claim 11, wherein method further comprising:

receiving a user instruction to convert at least one template file into an HTML file; and at least partly in response to the user instruction, converting that at least one template file into an HTML file.

18. The method as defined in claim 11, the method further comprising storing at least one markup language-based template file.

19. The method as defined in claim 11, the method further comprising storing a Structured Query Language-based template file, an Extensible Markup Language-based template file and/or a Wireless Markup Language-based template file.

20. The system as defined in claim 11, further comprising a text file type-based template file.

21. A method, comprising:
providing a user interface for display on a user computer, the user interface configured to receive the following user inputs:
an identification of a location where a target file is to be stored;
a name of the target file,
an operating system command or application program that is to process the target file;
a user selection of a template file that contains changeable fields and non-changeable fields;
parsing the selected template file to identify the changeable fields;
dynamically generating an information exchange user interface that prompts the user to enter input for the changeable fields;
receiving user input for at least a portion of the changeable fields; and
generating the target file based at least on the selected template and the user input, wherein the user input is inserted into corresponding changeable fields.

22. The method as defined in claim 21, wherein the target file is an SQL, WML or XML document.

23. The method as defined in claim 21, wherein the target file is a markup language-based text document.

24. The method as defined in claim 21, wherein the target file is a text file type-based document.

25. The method as defined in claim 21, the method further comprising:
converting a first program, wherein the first program is incomplete and includes placeholders for variable names and an indication as to how many window panels there are to be, to a second graphics user interface based program that can be compiled, linked and executed; and
executing the second graphics user interface based program to cause a dialog frame window to be displayed to the user, wherein the dialog frame window prompts the user to input data for changeable fields.

26. The method as defined in claim 25, wherein the placeholders are replaced using names obtained from a fix sized set of static prompting labels.

27. The method as defined in claim 25, wherein the placeholders are replaced using a non-fixed sized set of prompting labels that are dynamically extracted from the user-selected template file.

28. The method as defined in claim 21, the method further comprising storing information related to the creation or a revision of the target file in an activity repository, including a time stamp.

* * * * *

UNITED STATES PATENT AND TRADEMARK OFFICE
CERTIFICATE OF CORRECTION

PATENT NO. : 7,320,007 B1
APPLICATION NO. : 11/006268
DATED : January 15, 2008
INVENTOR(S) : Peter Hon-You Chang It is certified that error appears in the above-identified patent and that said Letters Patent is hereby corrected as shown below:

At Title Page Column 2 (Abstract) Item [57], Line 4: Delete "promps" and insert -- prompts --, therefor.

At Title Page Column 2 (Abstract) Item [57], Line 8: Delete "user'summaries" and insert -- users' summaries --, therefor.

At Title Page Column 2 (Abstract) Item [57], Line 15: After "program, a" delete "a". (Second Occurrence).

At Title Page Column 2 (Abstract) Item [57], Line 16: Delete "programe" and insert -- program --, therefor.

At Drawing Sheet 5 of 24 (Reference Numeral 155) (FIG. 4B), Line 2: Delete "globall" and insert -- global --, therefor.

At Drawing Sheet 11 of 24 (Reference Numeral 334) (FIG. 6C), Line 1: Delete "complier" and insert -- compiler --, therefor.

At Column 2, Line 1: Delete "finctions" and insert -- functions --, therefor.

At Column 7, Line 3: After "screen" delete ".".

At Column 7, Line 28 (Approximately): After "Window." delete ".".

At Column 9, Line 21: After "used" insert -- . --.

At Column 9, Line 23 (Approximately): Delete "createPromt" and insert -- createPrompt --, therefor.

At Column 11, Line 4: Delete "IstHeight" and insert -- 1stHeight --, therefor.

At Column 12, Line 65: Delete "unchangeablefields" and insert -- unchangeable fields --, therefor.

At Column 13, Line 17: Delete "eva" and insert -- evar --, therefor.

UNITED STATES PATENT AND TRADEMARK OFFICE
CERTIFICATE OF CORRECTION

PATENT NO. : 7,320,007 B1
APPLICATION NO. : 11/006268
DATED : January 15, 2008
INVENTOR(S) : Peter Hon-You Chang It is certified that error appears in the above-identified patent and that said Letters Patent is hereby corrected as shown below:

At Column 15, Line 4: After "<item amount" insert -- = --.

At Column 16, Line 20: Delete "<description>" and insert -- </description> --, therefor.

At Column 19, Line 38 Claim 6 (Approximately): In Claim 6, delete "predetermined" and insert -- pre-determined --, therefor.

Signed and Sealed this

Twenty-sixth Day of August, 2008

JON W. DUDAS
*Director of the United States Patent and Trademark Office*